(12) United States Patent
Ahn et al.

(10) Patent No.: US 11,490,182 B2
(45) Date of Patent: Nov. 1, 2022

(54) DISPLAY DEVICE

(71) Applicant: Samsung Display Co. Ltd., Yongin-si (KR)

(72) Inventors: Yi Joon Ahn, Seoul (KR); Jung Hun Noh, Yongin-si (KR); Jae Woo Im, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/529,655

(22) Filed: Aug. 1, 2019

(65) Prior Publication Data

US 2020/0107088 A1  Apr. 2, 2020

(30) Foreign Application Priority Data

Oct. 1, 2018  (KR) .................. 10-2018-0116731

(51) Int. Cl.
| | |
|---|---|
| *H04R 1/02* | (2006.01) |
| *G06F 3/044* | (2006.01) |
| *H04R 3/04* | (2006.01) |
| *H04M 1/02* | (2006.01) |

(52) U.S. Cl.
CPC ............. *H04R 1/025* (2013.01); *G06F 3/044* (2013.01); *H04R 3/04* (2013.01); *G06F 2203/04105* (2013.01); *H04M 1/0266* (2013.01); *H04R 2201/028* (2013.01); *H04R 2499/11* (2013.01); *H04R 2499/15* (2013.01)

(58) Field of Classification Search
CPC .................... G06F 3/03547; G06F 3/042–048
See application file for complete search history.

(56) References Cited

U.S. PATENT DOCUMENTS

| 10,048,927 B2 * | 8/2018 | Brodkin ................. G10K 9/122 |
| 2010/0246855 A1 | 9/2010 | Chen |
| 2012/0244917 A1 * | 9/2012 | Hosoi ................. H04M 1/6066 |
| | | 455/575.1 |

(Continued)

FOREIGN PATENT DOCUMENTS

| EP | 1601171 | 11/2005 |
| WO | 2014001603 | 1/2014 |

OTHER PUBLICATIONS

Extended European Search Report dated Feb. 21, 2020, issued in EP Patent Application No. 19200430.7.

*Primary Examiner* — Dorothy Harris
(74) *Attorney, Agent, or Firm* — H.C. Park & Associates, PLC

(57) ABSTRACT

A display device including a display panel configured to display an image; a touch sensing device configured to sense a touch of an object; a sound driver configured to generate and transmit a first sound driving signal and a second sound driving signal according to first sound data and second sound data; and a sound generator configured to generate a sound according to the first and second sound driving signals, such that a sound pressure level in a first frequency range is between first and second sound pressure levels in a first operating mode and a second operating mode, wherein the display device is in the first operating mode in response to the touch sensing device not sensing the touch of the object, and the display device is in the second operating mode in response to the touch sensing device sensing the touch of the object.

19 Claims, 27 Drawing Sheets

(56) References Cited

U.S. PATENT DOCUMENTS

| | | | |
|---|---|---|---|
| 2014/0099992 A1 | 4/2014 | Burns et al. | |
| 2014/0101618 A1* | 4/2014 | Seo | G06F 3/04892 715/856 |
| 2014/0357321 A1 | 12/2014 | Yliaho et al. | |
| 2016/0132285 A1* | 5/2016 | Hawker | G06F 3/041 345/173 |
| 2016/0248894 A1* | 8/2016 | Hosoi | H04M 1/05 |
| 2017/0287992 A1* | 10/2017 | Kwak | H04M 1/0264 |
| 2018/0367656 A1* | 12/2018 | Kim | G06F 21/32 |
| 2019/0387299 A1* | 12/2019 | Evans | G02B 27/017 |

* cited by examiner

FIG. 15B

|  | Increase/decrease of difference between driving voltages |
|---|---|
| FR1 | ↑ ↑ |
| FR2 | ↓ ↓ |
| FR3 | ↓ ↓ ↓ |

FIG. 16B

|  | Increase/decrease of difference between driving voltages |
|---|---|
| FR1 | ↑ |
| FR2 | ↓ |
| FR3 | ↓ ↓ |

FIG. 17B

|  | Increase/decrease of difference between driving voltages |
|---|---|
| FR1 | — |
| FR2 | — |
| FR3 | — |

DISPLAY DEVICE

CROSS REFERENCE TO RELATED APPLICATION

This application claims priority from and the benefit of Korean Patent Application No. 10-2018-0116731, filed on Oct. 1, 2018, which is hereby incorporated by reference for all purposes as if fully set forth herein.

BACKGROUND

Field

Exemplary embodiments of the invention relate generally to a display device.

Discussion of the Background

With the development of information-oriented society, demands for display devices for displaying images are increasing in various forms. For example, display devices are used for various electronic appliances such as smart phones, tablet PCs, digital cameras, notebook computers, navigators, and televisions. The display device includes a display panel for displaying an image and a sound generator for providing a sound.

When the display device is implemented as a smart phone, a user may make a call by making his ear contact the display device in a call mode, or may make a call without making contact in the call mode. Further, in the call mode, pressure to allow the ear to press the display device is different for each user. However, the sound pressure level of a sound provided by the sound generator with respect to a wavelength may change depending on the position of the user's ear, for example, whether the user's ear contacts the display device in the call mode and the pressure to allow the user's ear to press the display device. Therefore, in order to provide high-quality sound to the user in the call mode, it is required to adjust the sound pressure level of a sound with respect to a wavelength depending on whether the user's ear contact the display device in the call mode and the pressure to allow the user's ear to press the display device.

The above information disclosed in this Background section is only for understanding of the background of the inventive concepts, and, therefore, it may contain information that does not constitute prior art.

SUMMARY

Devices constructed according to exemplary implementations of the invention are capable of providing a display device which can provide a high-quality sound by maintaining the sound pressure level of a sound uniform in a low-frequency range, a middle-frequency range, and a high-frequency range depending on different locations of a user's ear, for example, contacting the front surface of the display device and/or the pressure of the user's ear pressing the display device.

Additional features of the inventive concepts will be set forth in the description which follows, and in part will be apparent from the description, or may be learned by practice of the inventive concepts.

According to one or more exemplary embodiments of the invention, a display device includes: a display panel configured to display an image; a touch sensing device configured to sense a touch of an object; a sound driver configured to generate and transmit a first sound driving signal and a second sound driving signal according to first sound data and second sound data; and a sound generator configured to generate a sound according to the first sound driving signal and the second sound driving signal, such that a sound pressure level in a first frequency range is between a first sound pressure level and a second sound pressure level in a first operating mode and a second operating mode, wherein the display device is in the first operating mode in response to the touch sensing device not sensing the touch of the object, and the display device is in the second operating mode in response to the touch sensing device sensing the touch of the object.

The sound generator may be configured to generate the sound such that a sound pressure level in a second frequency range may be between a third sound pressure level and the second sound pressure level in the first operating mode and second operating mode, and wherein the third sound pressure level may be higher than the first sound pressure level and the second frequency range may be higher than the first frequency range.

The sound generator may be configured to generate the sound such that a sound pressure level in a third frequency range may be between the first sound pressure level and the second sound pressure level in the first operating mode and second operating mode, and the third frequency range may be higher than the second frequency range.

The sound generator may be configured to generate the sound such that a sound pressure level within a frequency range of 200 Hz to 5 kHz may be between a third sound pressure level and the second sound pressure level, and the third sound pressure level may be higher than the first sound pressure level.

The touch sensing device may be disposed on a first surface of the display panel, and the sound generator may be disposed on a second surface of the display panel, opposite to the first surface.

The display device may further include a pressure sensing device configured to sense pressure of the object, the display device may be in the second operating mode in response to the pressure sensing device sensing the pressure of the object being equal to or lower than a first pressure, and the display device may be in a third operating mode in response to the pressure sensing device sensing the pressure of the object being higher than the first pressure and may be equal to or lower than a second pressure.

The touch sensing device may be disposed on a first surface of the display panel, the sound generator may be disposed on a second surface of the display panel, opposite to the first surface, and the pressure sensing device may be disposed on the second surface of the display panel except for a region where the sound generator may be disposed.

The sound generator may be configured to generate the sound such that the sound pressure level in a second frequency range may be between a third sound pressure level and the second sound pressure level in the second operating mode and third operating mode, the first sound pressure level may be higher than the first sound pressure level and the second frequency range may be higher than the first frequency range.

The sound generator may be configured to generate the sound such that a sound pressure level in a third frequency range may be between the first sound pressure level and the second sound pressure level in the second operating mode and third operating mode, and the third frequency range may be higher than the second frequency range.

The sound generator may be configured to generate the sound such that a sound pressure level within a frequency range of 200 Hz to 5 kHz may be between a third sound pressure level and the second sound pressure level, and the third sound pressure level may be higher than the first sound pressure level.

The display device may be in a fourth operating mode in response to the pressure sensing device sensing the pressure of the object being higher than the second pressure, and the sound generator may be configured to generate the sound such that a sound pressure level in a frequency range of 2 kHz or more may be decreased in the fourth operating mode.

The sound generator may be configured to generate the sound such that, a sound pressure level in a frequency range of 5 kHz or more may be equal to or lower than a fourth sound pressure level in the fourth operating mode, the fourth sound pressure level being lower than the third sound pressure level.

The display device may be in the second operating mode in response to a contact area of the object being less than a first area, and the display device may be in a third operating mode in response to the contact area of the object being larger than a first area and may be equal to or smaller than a second area, and the sound generator may be configured to generate a sound such that the sound pressure level in the first frequency range may be between the first sound pressure level and the second sound pressure level in the second operating mode and the third operating mode.

The sound generator may be configured to generate the sound such that the sound pressure level in a second frequency range of the sound may be between a third sound pressure level and the second sound pressure level in the second operating mode and the third operating mode, and the third sound pressure level may be higher than the first sound pressure level, and the second frequency range may be higher than the first frequency range.

The sound generator may be configured to generate the sound such that a sound pressure level in a third frequency range may be between the first sound pressure level and the second sound pressure level in the second operating mode and the third operating mode, and the third frequency range may be higher than the second frequency range.

The sound generator may be configured to generate the sound such that a sound pressure level within a frequency range of 200 Hz to 5 kHz may be between a third sound pressure level and the second sound pressure level, and the third sound pressure level may be higher than the first sound pressure level.

The display device may be in a fourth operating mode in response to the contact area of the object being larger than the second area, and the sound generator may be configured to generate the sound such that a sound pressure level in a frequency range of 2 kHz or more may be decreased in the fourth operating mode.

The sound generator may be configured to generate the sound such that, a sound pressure level in a frequency range of 5 kHz or more may be equal to or lower than a fourth sound pressure level in the fourth operating mode, the fourth sound pressure level being lower than the third sound pressure level.

The display device may further include: a digital signal processor configured to modulate the first sound data and the second sound data for each of the first frequency range, a second frequency range higher than the first frequency range, and a third frequency range higher than the second frequency range.

The sound driver may further include: a digital-analog converter configured to convert the first sound data and the second sound data modulated by the digital signal processor into a first driving voltage and a second driving voltage, which are analog signals; and an amplifier configured to amplify and transmit the first driving voltage and the second driving voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 15B is a table showing the increase and decrease of driving voltages applied to the first sound generator.

FIG. 16B is a table showing the increase and decrease of driving voltages applied to the first sound generator.

FIG. 17B is a table showing the increase and decrease of driving voltages applied to the first sound generator.

DETAILED DESCRIPTION

Figure 1:
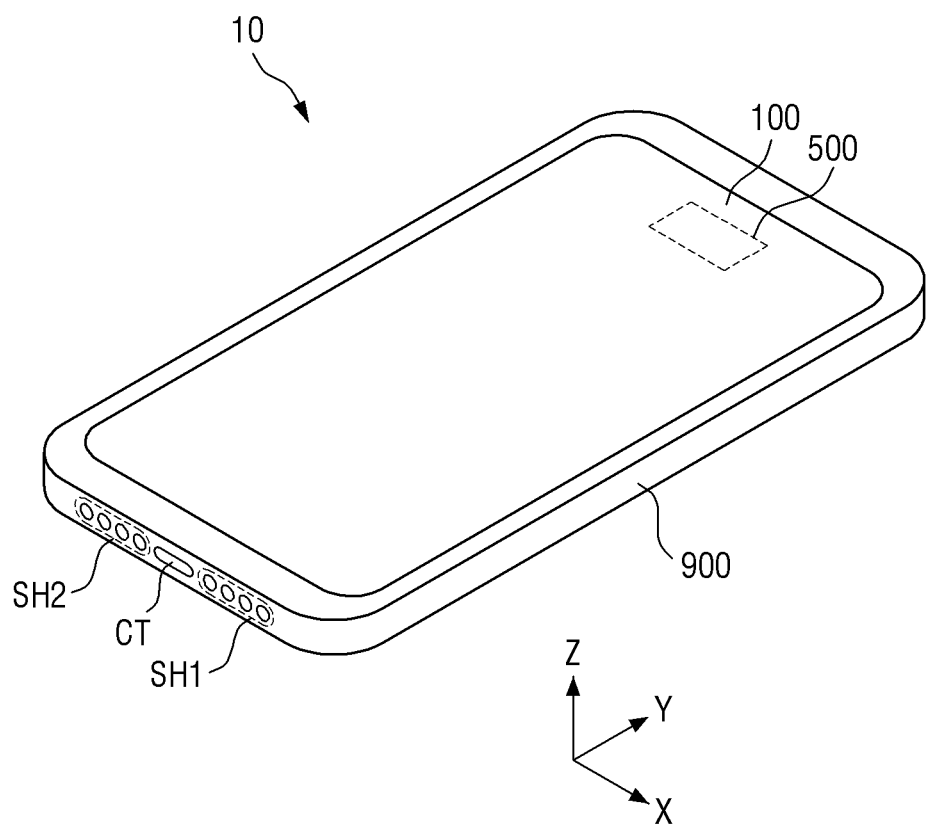
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, an X-axis, a Y-axis, and a Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
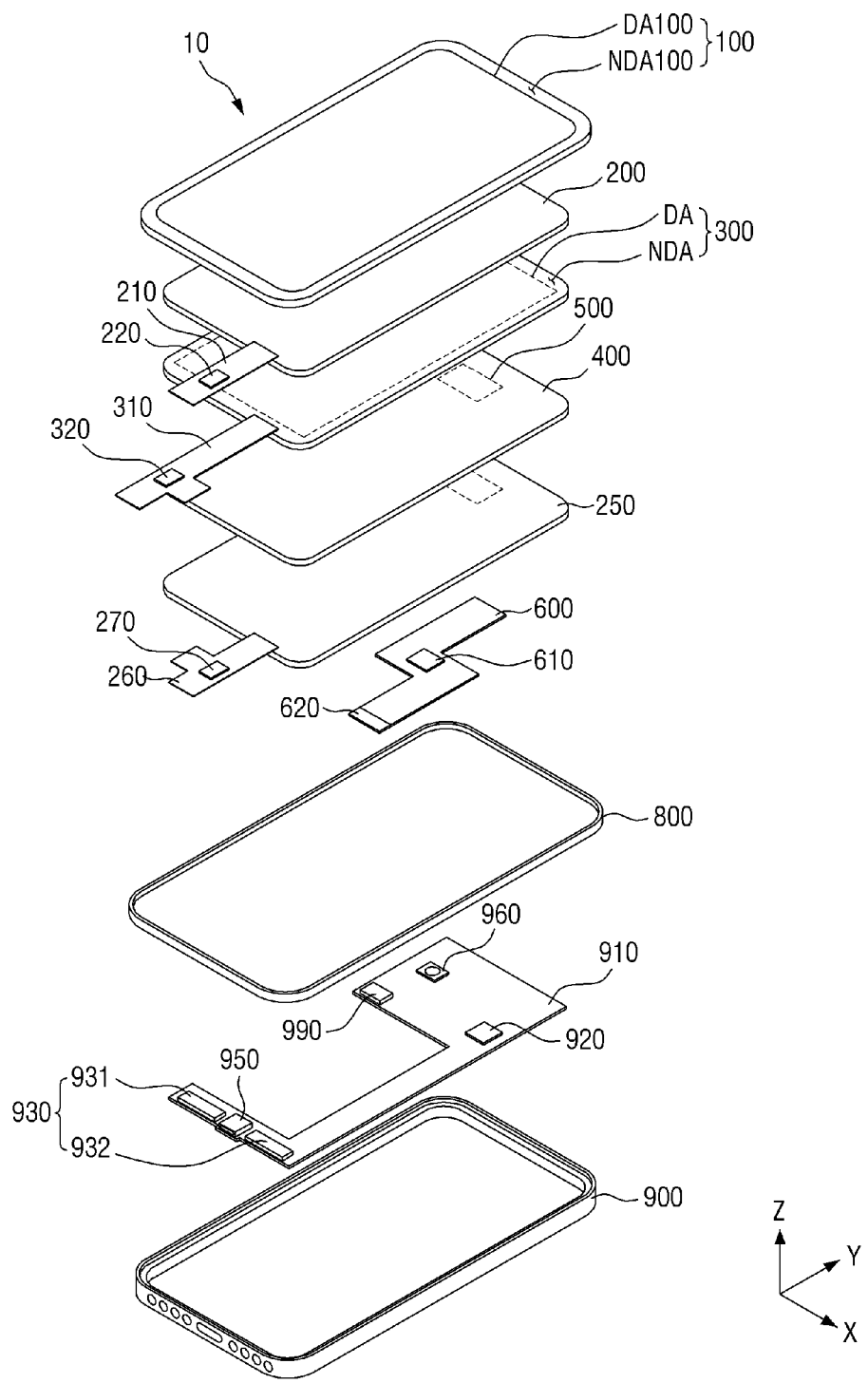
FIG. 2 is an exploded perspective view of a display device according to an exemplary embodiment.
Figure 3:
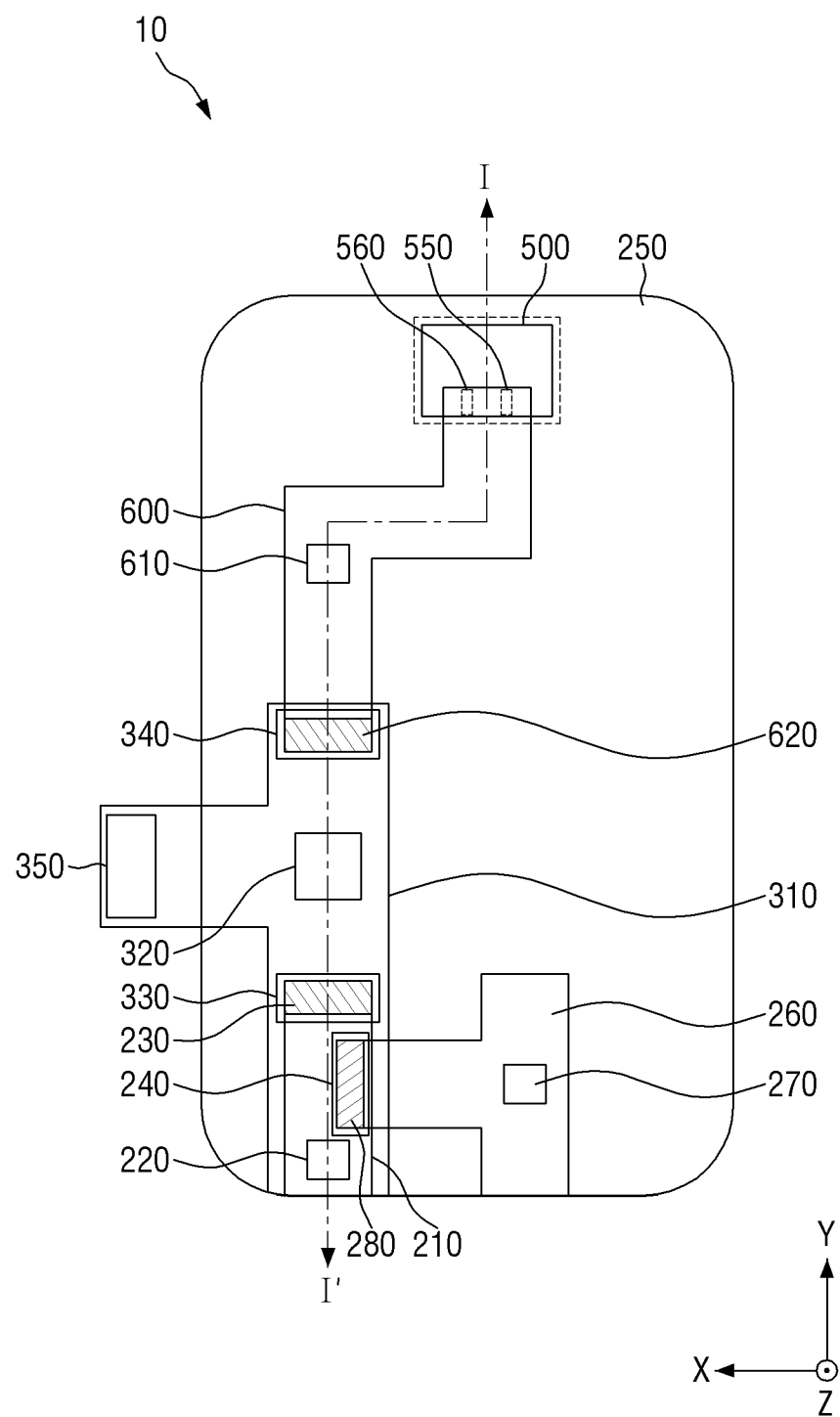
FIG. 3 is a back view showing a panel lower support, a first sound generator, a sound circuit board, a display circuit board, and a touch circuit board in the display device of FIG. 2.
Figure 4:
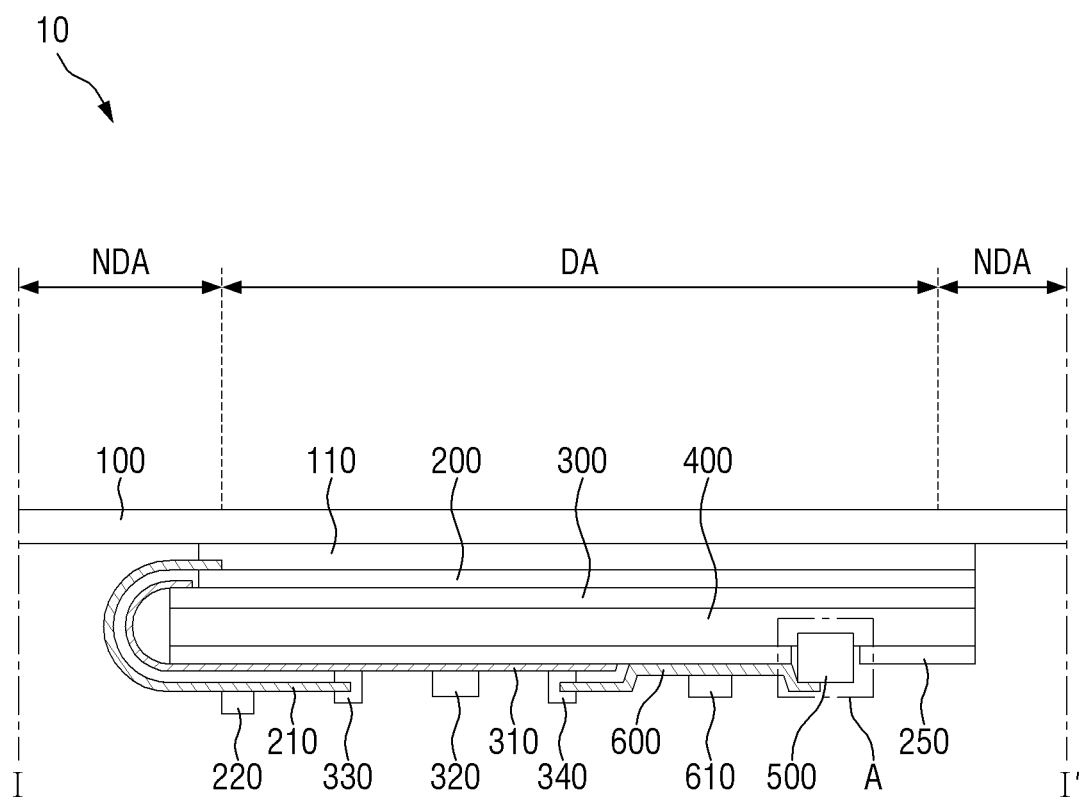
FIG. 4 is a cross-sectional view taken along a sectional line I-I' of FIG. 3.
Figure 5:
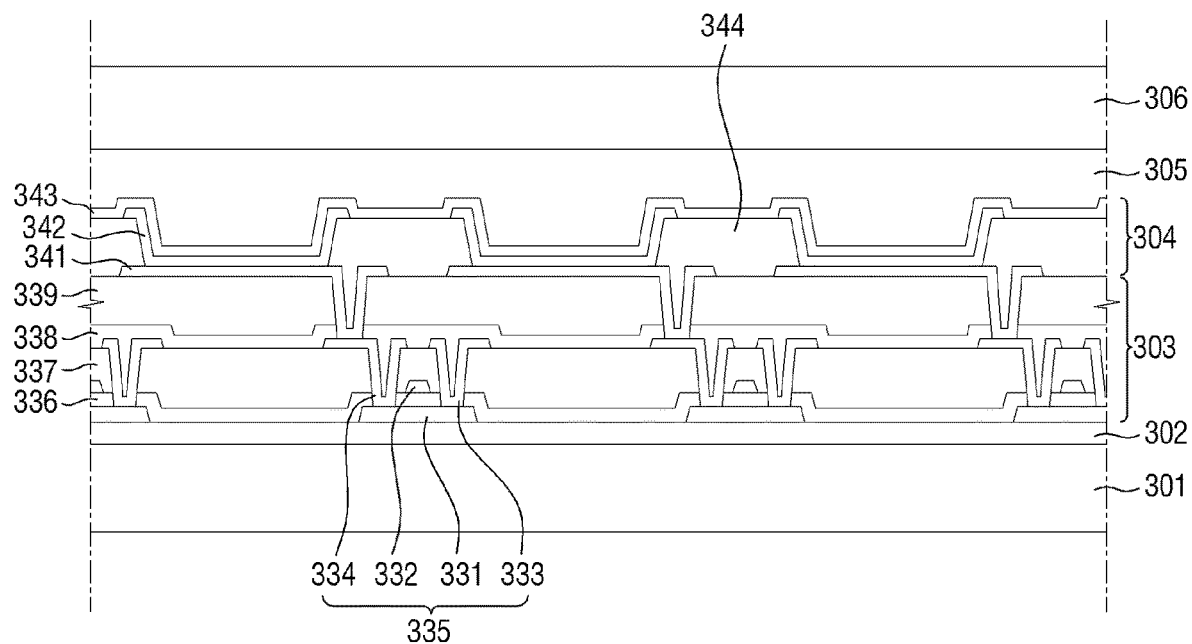
FIG. 5 is a cross-sectional view showing the display area of the display panel of FIG. 4.
Figure 6:
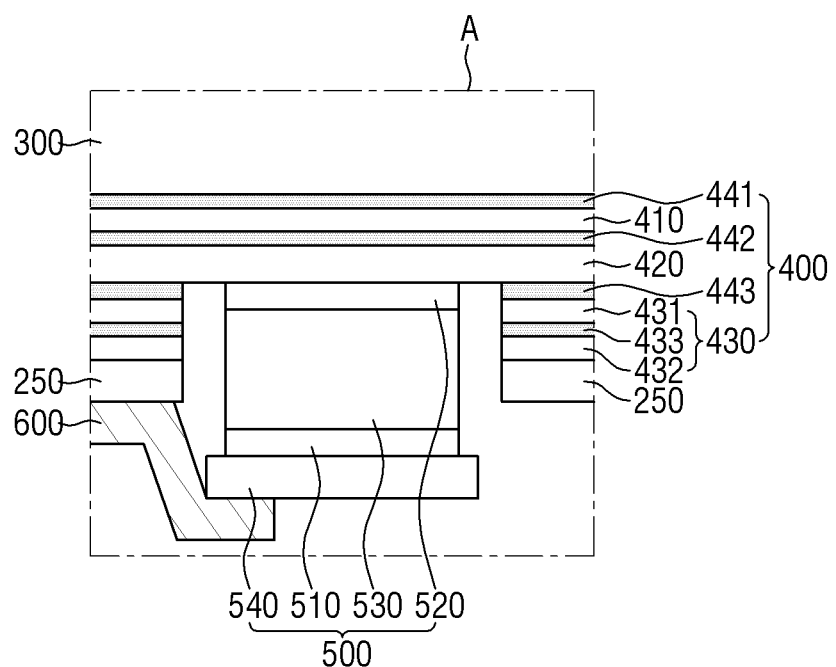
FIG. 6 is an enlarged cross-sectional view of the region A in FIG. 4.
Figure 7:
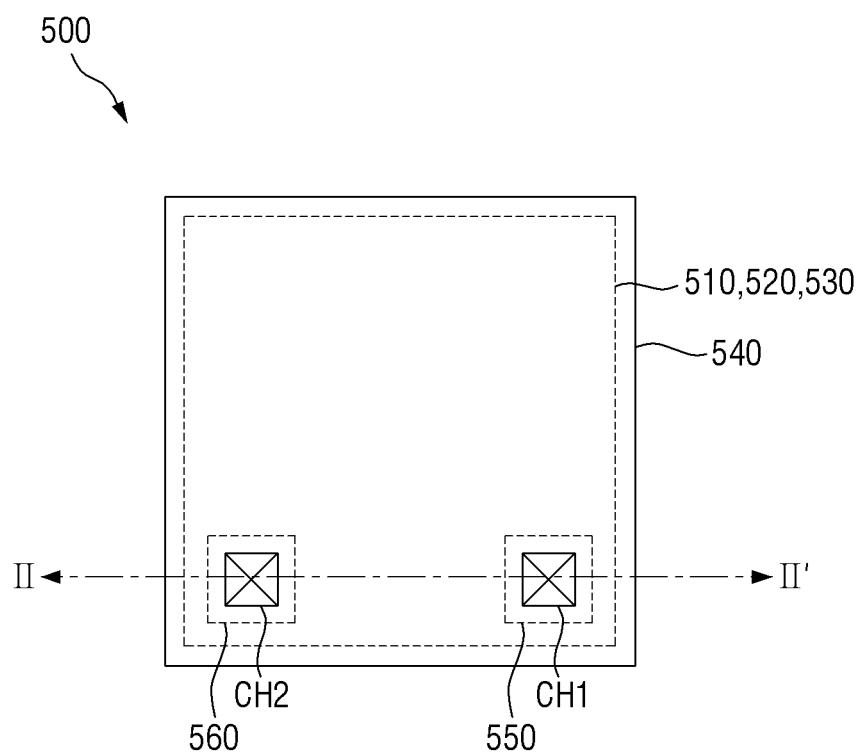
FIG. 7 is a plan view showing the first sound generator of FIG. 3.
Figure 8:
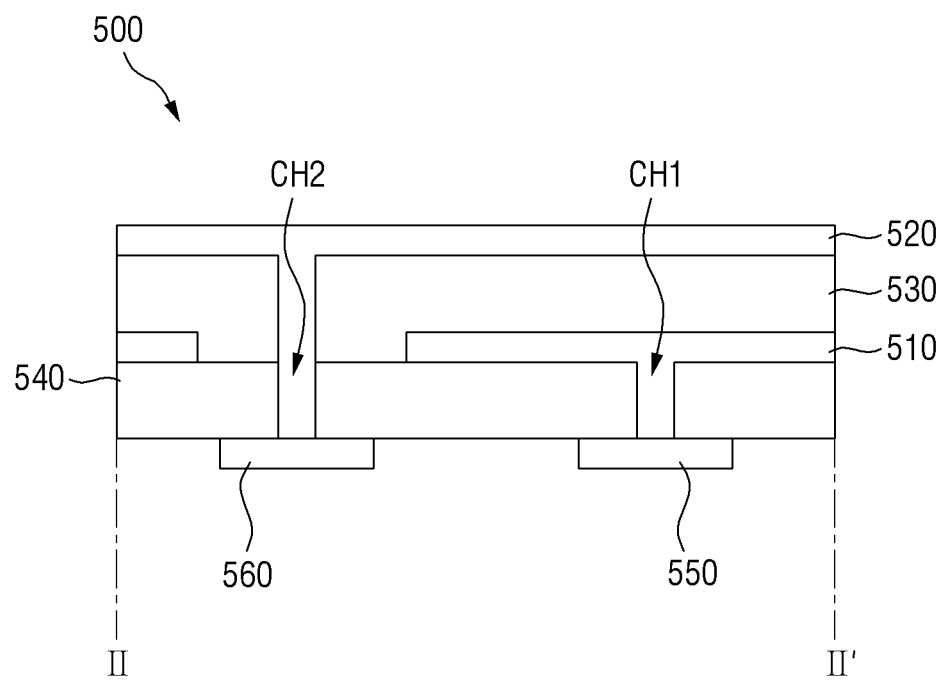
FIG. 8 is a cross-sectional view taken along a sectional line II-II' of FIG. 7.
Figure 9:
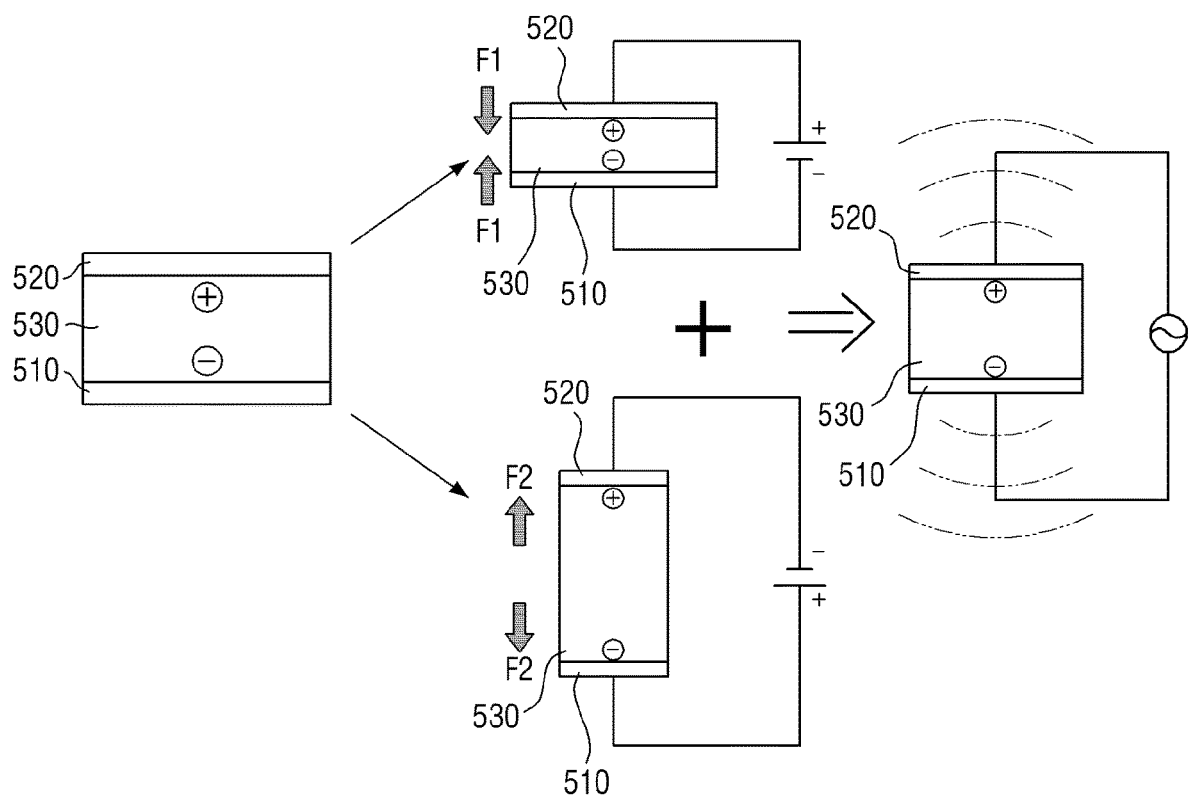
FIG. 9 is an schematic view illustrating exemplary vibration of the first sound generator.

FIG. 1 is a perspective view of a display device 10 according to an exemplary embodiment. FIG. 2 is an exploded perspective view of a display device according to an exemplary embodiment. FIG. 3 is a back view showing a panel lower support, a first sound generator, a sound circuit board, a display circuit board, and a touch circuit board in the display device of FIG. 2. FIG. 4 is a cross-sectional view taken along a sectional line I-I' of FIG. 3. FIG. 5 is a cross-sectional view showing the display area of the display panel of FIG. 4. FIG. 6 is an enlarged cross-sectional view of the region A in FIG. 4. FIG. 7 is a plan view showing the first sound generator of FIG. 3. FIG. 8 is a cross-sectional view taken along a sectional line of FIG. 7. FIG. 9 is an schematic view illustrating exemplary vibration of the first sound generator.

FIGS. 1 and 2 illustrate that the display device according to an exemplary embodiment is a portable terminal. The portable terminal may include a smart phone, a tablet PC, a personal digital assistant (PDA), a portable multimedia player (PMP), a game machine, and a wristwatch type electronic appliance. However, the display device according to an exemplary embodiment is not limited to the portable terminal, and may be used for small and middle electronic appliances such as a monitor, a notebook computer, a car navigator, and a camera as well as large electronic appliances such as a television and an outside billboard.

Referring to FIGS. 1 and 2, a display device 10 according to an exemplary embodiment includes a cover window 100, a touch sensing device 200, a touch circuit board 210, a display panel 300, a display circuit board 310, a panel lower support 400, a first sound generator 500, a sound circuit board 600, a pressure sensing device 250, a lower bracket 800, a main circuit board 910, and a lower cover 900.

In this specification, the "on", "over", "top", "upper side", or "upper surface" refers to a direction in which the cover window 100 is disposed, that is, a Z-axis direction, with respect to the display panel 300, and the "beneath", "under", "bottom", "lower side", or "lower surface" refers to a direction in which the panel lower support 400 is disposed, that is, a direction opposite to the Z-axis direction, with respect to the display panel 300.

The display device 10 may have a rectangular shape in a plan view. For example, as shown in FIG. 1, the display device 10 may have a rectangular planar shape having short sides in the first direction (X-axis direction) and long sides in the second direction (Y-axis direction). The edge where the short side in the first direction (X-axis direction) meets the long side in the second direction (Y-axis direction) may be formed to have a round shape of a predetermined curvature or have a right angle shape as shown in FIG. 1. The planar shape of the display device 10 is not limited to a rectangular shape, and may be formed in another polygonal shape, circular shape, or elliptical shape.

The cover window 100 may be disposed on the display panel 300 so as to cover the upper surface of the display panel 300. Thus, the cover window 100 may function to protect the upper surface of the display panel 300. The cover window 100 may be attached to the touch sensing device 200 through an adhesive member 110 as shown in FIG. 4. The adhesive member 110 may be an optically clear adhesive (OCA) film or an optically clear resin (OCR) film.

The cover window 100 may include a light transmitting portion DA100 corresponding to a display area DA of the display panel 300 and a light blocking portion NDA100 corresponding to a non-display area NDA of the display panel 300. The light blocking portion NDA100 may be formed to be opaque. Or, the light blocking portion NDA100 may be formed as a decorative layer having a pattern that can be seen to a user when an image is not displayed. For example, a company logo such as SAMSUNG® or various characters may be patterned on the light blocking portion NDA100.

The cover window 100 may be made of glass, sapphire, and/or plastic. The cover window 100 may be rigid or flexible.

The touch sensing device 200 may be disposed between the cover window 100 and the display panel 300. The touch sensing device 200 is a unit for sensing a touch position of a user, and may be implemented as a capacitive type such as a self-capacitance type or a mutual capacitance type.

The touch sensing device 200 may be a panel type or a film type. Or, the touch sensing device 200 may be formed to be integrated with the display panel 300. For example, when the touch sensing device 200 is a film type, the touch sensing device 200 may be formed to be integrated with a barrier film of encapsulating the display panel 300.

The touch circuit board 210 may be attached to one side of the touch sensing device 200. Specifically, the touch circuit board 210 may be attached onto pads provided on one side of the touch sensing device 200 using an anisotropic conductive film. Further, the touch circuit board 210 may be provided with a touch connection portion 230 as shown in FIG. 2, and the touch connection portion 230 may be connected to a first connector 330 of the display circuit board 310. The touch circuit board 210 may be a flexible printed circuit board or a chip on film (COF).

The touch driving unit 220 may apply touch driving signals to the touch sensing device 200, sense sensing signals from the touch sensing device 200, and analyze the sensing signals to calculate a touch position of the user. The touch driving unit 220 may be formed as an integrated circuit and mounted on the touch circuit board 210.

The display panel 300 may include a display area DA and a non-display area NDA. The display area DA is an area in which an image is displayed, and the non-display area NDA is an area in which no image is displayed, and may be a peripheral area of the display area NDA. The non-display area NDA may be disposed so as to surround the display area DA as shown in FIGS. 1 and 2, but the exemplary embodiments are not limited thereto. The display area DA may be disposed to overlap the light transmitting portion DA100 of the cover window 100, and the non-display area NDA may be disposed to overlap the light blocking portion NDA100 of the cover window 100.

The display panel 300 may be a light emitting display panel including a light emitting element. Examples of the display panel 300 may include an organic light emitting display panel using an organic light emitting diode, an ultra-small light emitting diode display panel using a micro LED, or a quantum dot light emitting diode display panel using a quantum dot light emitting diode. Hereinafter, the display panel 300 will be mainly described as an organic light emitting display panel as shown in FIG. 5.

Referring to FIG. 5, the display area DA of the display panel 300 refers to an area where a light emitting element layer 304 is formed to display an image, and the non-display area NDA thereof refers to an area around the display area DA.

The display panel 300 may include a support substrate 301, a flexible substrate 302, a thin film transistor layer 303, a light emitting element layer 304, a thin film encapsulation layer 305, and a barrier film 306.

The flexible substrate 302 is disposed on the support substrate 301. Each of the support substrate 301 and the flexible substrate 302 may include a polymer material having flexibility. For example, each of the support substrate 301 and the flexible substrate 302 may include polyethersulphone (PES), polyacrylate (PA), polyarylate (PAR), polyetherimide (PEI), polyethylenenapthalate (PEN), polyethylene terepthalate (PET), polyphenylenesulfide (PPS), polyallylate, polyimide (PI), polycarbonate (PC), cellulosetriacetate (CAT), cellulose acetate propionate (CAP), or a combination thereof.

The thin film transistor layer 303 is disposed on the flexible substrate 302. The thin film transistor layer 303 includes thin film transistors 335, a gate insulating film 336, an interlayer insulating film 337, a protective film 338, and a planarization film 339.

A buffer film may be formed on the flexible substrate 302. The buffer film may be formed on the flexible substrate 302 so as to protect thin film transistors 335 and light emitting elements from moisture penetrating through the support substrate 301 and the flexible substrate 302 which are vulnerable to moisture. The buffer film may be formed of a plurality of alternately laminated inorganic films. For example, the buffer film may be formed of a multi-layer film in which one or more inorganic layers including one or more of a silicon oxide (SiOx), a silicon nitride (SiNx), and SiON are alternately stacked. The buffer film may be omitted.

The thin film transistor 335 is formed on the buffer film. The thin film transistor 335 includes an active layer 331, a gate electrode 332, a source electrode 333, and a drain electrode 334. Although it is shown in FIG. 8 that the thin film transistor 335 is formed by a top gate manner in which the gate electrode 332 is located on the active layer 331, it should be noted that the exemplary embodiments are not limited thereto. That is, the thin film transistor 335 may be formed by a bottom gate manner in which the gate electrode 332 is located beneath the active layer 331, or may be formed by a double gate manner in which the gate electrode 332 is located both on and beneath the active layer 331.

The active layer 331 is formed on the buffer film. The active layer 331 may be formed of a silicon-based semiconductor material or an oxide-based semiconductor material. A light blocking layer for blocking external light incident on the active layer 331 may be formed between the buffer film and the active layer 331.

The gate insulating film 336 may be formed on the active layer 331. The gate insulating film 336 may be formed of an inorganic film, for example, a silicon oxide (SiOx) film, a silicon nitride (SiNx) film, or a combination thereof.

The gate electrode 332 and a gate line may be formed on the gate insulating film 336. The gate electrode 332 and the gate line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The interlayer insulating film 337 may be formed on the gate electrode 332 and the gate line. The interlayer insulating film 337 may be formed of an inorganic film, for example, a silicon oxide (SiOx) film, a silicon nitride (SiNx) film, or a combination thereof.

The source electrode 333, the drain electrode 334, and a data line may be formed on the interlayer insulating film. Each of the source electrode 333 and the drain electrode 334 may be connected to the active layer 331 through a contact hole penetrating the gate insulating film 336 and the interlayer insulating film 337. The source electrode 333, the drain electrode 334, and the data line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The protective film 338 for insulating the thin film transistor 335 may be formed on the source electrode 333, the drain electrode 334, and the data line. The interlayer insulating film 337 may be formed of an inorganic film, for example, a silicon oxide (SiOx) film, a silicon nitride (SiNx) film, or a combination thereof.

The planarization film 339 for flattening a step due to the thin film transistor 335 may be formed on the protective film 338. The planarization film 339 may be formed of an organic film including an acryl resin, an epoxy resin, a phenolic resin, a polyamide resin, or a polyimide resin.

The light emitting element layer 304 is formed on the thin film transistor layer 303. The light emitting element layer 304 includes light emitting elements and a pixel defining film 344.

The light emitting elements and the pixel defining film 344 are formed on the planarization film 339. The light emitting element may be an organic light emitting element. In this case, the light emitting element may include an anode electrode 341, a light emitting layer 342, and a cathode electrode 343.

The anode electrode 341 may be formed on the planarization film 339. The anode electrode 341 may be connected to the source electrode 333 of the thin film transistor 335 through a contact hole penetrating the protective film 338 and the planarization film 339.

The pixel defining film 344 may be formed on the planarization film 339 to cover the edge of the anode electrode 341 so as to partition pixels. That is, the pixel defining film 344 serves to define pixels. Each of the pixels refers to an area where the anode electrode 341, the light emitting layer 342, and the cathode electrode 343 are sequentially laminated, and holes from the anode electrode 341 and electrons from the cathode electrode 343 are combined with each other in the light emitting layer 342 to emit light.

The light emitting layer 342 is formed on the anode electrode 341 and the pixel defining film 344. The light emitting layer 342 is an organic light emitting layer. The light emitting layer 342 may emit one of red light, green light, and blue light. The peak wavelength range of red light may be about 620 nm to 750 nm, and the peak wavelength range of green light may be about 495 nm to 570 nm. Further, the peak wavelength range of blue light may be about 450 nm to 495 nm. The light emitting layer 342 may be a white light emitting layer that emits white light. In this case, the light emitting layer 342 may have a laminate structure of a red light emitting layer, a green light emitting layer, and a blue light emitting layer, and may be a common layer formed commonly in the pixels. In this case, the display panel 300 may further include color filters for displaying red, green, and blue colors.

The light emitting layer 342 may include a hole transporting layer, a light emitting layer, and an electron transporting layer. Further, the light emitting layer 342 may be formed to have a tandem structure of two stacks or more, and in this case, a charge generating layer may be formed between the stacks.

The cathode electrode 343 is formed on the light emitting layer 342. The cathode electrode 343 may be formed to cover the light emitting layer 342. The cathode electrode 343 may be a common layer formed commonly in the pixels.

When the light emitting element layer 304 is formed by a top emission manner in which light is emitted upward, the anode electrode 341 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. The APC alloy may be an alloy of silver (Ag), palladium (Pd), and copper alloy (Cu). The cathode electrode 343 may be formed of a transparent conductive material (TCO) such as ITO or IZO, which is light-transmissive, or a semi-transmissive conductive material such as magnesium (Mg), silver (Ag), or an alloy of magnesium (Mg) and silver (Ag). When the cathode electrode 343 is formed of a semi-transmissive conductive material, light emission efficiency may be increased by a microcavity.

When the light emitting element layer 304 is formed by a bottom emission manner in which light is emitted downward, the anode electrode 341 may be formed of a transparent conductive material (TCO) such as ITO or IZO, or a semi-transmissive conductive material such as magnesium (Mg), silver (Ag), or an alloy of magnesium (Mg) and silver (Ag). The cathode electrode 343 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. When the anode electrode 341 is formed of a semi-transmissive conductive material, light emission efficiency may be increased by a microcavity.

The encapsulation layer 305 is formed on the light emitting element layer 304. The encapsulation layer 305 serves to prevent or limit oxygen or moisture from permeating the light emitting layer 342 and the cathode electrode 343. For this purpose, the encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The encapsulation layer 305 may further include at least one organic film. The organic film may be formed to have a sufficient thickness to prevent or limit foreign matter (particles) from penetrating the encapsulation layer 305 and entering the light emitting layer 342 and the cathode electrode 343. The organic film may include any one of epoxy, acrylate, and urethane acrylate.

The barrier film 306 is disposed on the encapsulation layer 305. The barrier film 306 is disposed so as to cover the encapsulation layer 305 to protect the light emitting element layer 304 from oxygen and moisture. The barrier film 306 may be formed to be integrated with the touch sensing device 200.

A polarizing film may be additionally attached to the upper surface of the display panel 300 so as to prevent or reduce the deterioration of visibility due to external light reflection.

The display circuit board 310 may be attached to one side of the display panel 300. Specifically, the display circuit board 310 may be attached onto pads provided on one side of the display panel 300 using an anisotropic conductive film.

The touch circuit board 210 and the display circuit board 310 may be bent downward from the top of the display panel 300 as shown in FIG. 4. In contrast, the sound circuit board 600 is not bent because it is disposed under the panel lower support 400. The display circuit board 310 may be connected to the touch connection portion 230 of the touch circuit board 210 through the first connector 330. The display circuit board 310 may be connected to the sound connection portion 620 of the sound circuit board 600 through the second connector 340. The display circuit board 310 may be connected to the main circuit board 910 through the third connector 350. It is illustrated in FIG. 2 that the display circuit board 310 includes first, second, and third connectors 330, 340, and 350. However, the exemplary embodiments are not limited thereto. For example, the display circuit board 310 may include pads corresponding to the first and second connectors 330 and 340 instead of the first and second connectors 330 and 340. In this case, the display circuit board 310 may be connected to the touch circuit board 210 and the sound circuit board 600.

The display driving unit 320 outputs signals and voltages for driving the display panel 300 through the display circuit board 310. The display driving unit 320 may be formed as an integrated circuit and mounted on the display circuit board 310, but the exemplary embodiments are not limited thereto. For example, the display driving unit 320 may be attached to one side of the display panel 300.

The panel lower support 400 may be disposed under the display panel 300. The panel lower support 400 may include at least one of a heat dissipating layer for efficiently dissipating the heat of the display panel 300, an electromagnetic wave blocking layer for blocking electromagnetic waves, a light blocking layer for blocking external light, a light absorbing layer for absorbing external light, and a buffer layer for absorbing an external impact.

Specifically, as shown in FIG. 6, the panel lower support 400 may include a light absorbing member 410, a buffer member 420, a heat dissipating member 430, and first, second, and third adhesive layers 441, 442, and 443.

The light absorbing member 410 may be disposed under the display panel 300. The light absorbing member 410 inhibits the transmission of light to prevent or limit components disposed under the light absorbing member, that is, a first sound generator and the like from being viewed from above the display panel 300. The light absorbing member 410 may include a light absorbing material such as a black pigment or a dye.

The buffer member 420 may be disposed under the light absorbing member 410. The buffer member 420 absorbs an external impact to prevent or reduce damage to the display panel 300. The buffer member 420 may be composed of a single layer or a plurality of layers. For example, the buffer member 420 may be formed of a polymer resin such as polyurethane, polycarbonate, polypropylene, or polyethylene, or may be formed of an elastic material such as a rubber, a urethane material, or a sponge formed by foaming an acrylic material. The buffer member 420 may be a cushion layer.

The heat dissipating member 430 may be disposed under the buffer member 420. The heat dissipating member 430 may include at least one heat dissipating layer. For example, as shown in FIG. 7, the heat dissipating member 430 may include a first heat dissipating layer 431 including graphite or carbon nanotubes, a second heat dissipating layer 432 capable of blocking electromagnetic waves and formed of a metal thin film of copper, nickel, ferrite or silver having excellent thermal conductivity, and a fourth adhesive layer 433 for attaching the first heat dissipating layer 431 to the second heat dissipating layer 432.

The first adhesive layer 441 attaches the light absorbing member 410 to the lower surface of the display panel 300. The second adhesive layer 442 attaches the buffer member 420 to the lower surface of the light absorbing member 410. The third adhesive layer 443 attaches the heat dissipating member 430 to the lower surface of the buffer member 420. Each of the first, second, and third adhesive layers 441, 442, and 443 may contain a silicon-based polymer, a urethane-based polymer, an SU polymer having a silicon-urethane hybrid structure, an acrylic polymer, an isocyanate-based polymer, polyvinyl alcohol, gelatin, latex, polyester, or aqueous polyester.

The first sound generator 500 may be disposed on the lower surface of the panel lower support 400. When the first sound generator 500 is disposed on the heat dissipating member 430 of the panel lower support 400, the first heat dissipating layer 431 or second heat dissipating layer 432 of the heat dissipating member 430 may be broken by the vibration of the first sound generator 500. Therefore, in the region where the first sound generator 500 is disposed, the heat dissipating member 430 may be removed, and the first sound generator 500 may be disposed on the buffer member 420.

The first sound generator 500 may output a first sound by generating vibration in response to a first sound signal. For this purpose, the first sound generator 500 may be vibrated by a vibration layer 530 deformed in response to the first sound signal. The first sound generator 500 may also be vibrated by an electromagnetic force generated by applying a current corresponding to the first sound signal to a coil surrounding a magnet. Hereinafter, it will be mainly described that the first sound generator 500 generates a sound by the vibration of the vibration layer 530.

As shown in FIGS. 7 and 8, the first sound generator 500 may include a first electrode 510, a second electrode 520, a vibration layer 530, a substrate 540, a first pad 550, and a second pad 560.

The first electrode 510 may be disposed on a first surface of the substrate 540, the vibration layer 530 may be disposed on the first electrode 510, and the second electrode 520 may be disposed on the vibration layer 530. The first pad 550 and the second pad 560 may be disposed on a second surface of the substrate 540.

The first electrode 510 and the second electrode 520 may be made of a conductive material. For example, the conductive material may be a transparent conductive material such as indium tin oxide (ITO) or indium zinc oxide (IZO), an opaque metal material, a conductive polymer, or carbon nanotubes (CNT).

The first electrode 510 may be connected to the first pad 550 through a first contact hole CH1 penetrating the substrate 540. Thus, the first electrode 510 may receive a first driving voltage from the sound driving unit 610 of the sound circuit board 600 through the first pad 550.

The second electrode 520 may be connected to the second pad 560 through a second contact hole CH2 penetrating the vibration layer 530 and the substrate 540. Thus, the second electrode 520 may receive a second driving voltage from the sound driving unit 610 of the sound circuit board 600 through the second pad 560.

The vibration layer 530 may be a piezo actuator that is deformed as shown in FIG. 9 according to a difference between the voltage applied to the first electrode 510 and the voltage applied to the second electrode 520. In this case, the vibration layer 530 may be at least one of a piezoelectric body such as a poly vinylidene fluoride (PVDF) film or a lead zirconate titanate (PZT) ceramic film, and an electroactive polymer film.

In this case, the vibration layer 530 is contracted by the first force F1 or is relaxed or expanded by the second force F2 according to the difference between the first driving voltage applied to the first electrode 510 and the second driving voltage applied to the second electrode 520. Specifically, as shown in FIG. 9, in the case where the vibration layer 530 adjacent to the first electrode 510 has positive polarity and the vibration layer 530 adjacent to the second electrode 520 has negative polarity, when the first driving voltage of positive polarity is applied to the first electrode 510 and the second driving voltage of negative polarity is applied to the second electrode 520, the vibration layer 530 may be contracted by the first force F1. Further, in the case where the vibration layer 530 adjacent to the first electrode 510 has positive polarity and the vibration layer 530 adjacent to the second electrode 520 has negative polarity, when the first driving voltage of negative polarity is applied to the first electrode 510 and the second driving voltage of positive polarity is applied to the second electrode 520, the vibration layer 530 may be contracted by the second force F2. When the first driving voltage applied to the first electrode 510 and the second driving voltage applied to the second electrode 520 are alternately repeated in positive and negative polarities, the vibration layer 530 repeatedly contracts and relaxes.

Accordingly, the first sound generator 500 vibrates, and thus the display panel 300 vibrates vertically, so as to output a first sound.

Further, the display panel 300 is vibrated by the first sound generator 500 to output the first sound, so that the display panel 300 serves as a diaphragm. The greater the size of the diaphragm, the greater the intensity of the sound pressure output from the diaphragm. Since the size of the diaphragm of the speaker applied to the display device is smaller than the area of the display panel 300, when the display panel 300 is used a diaphragm, the intensity of sound pressure may increase compared to when a speaker is used.

Further, since the first sound generator 500 may vibrate the display panel 300 to output the first sound, the display device 10 may output a sound by a sound generator not exposed to the outside. Thus, the sound generator disposed on the front surface of the display device 10 may be deleted, so that the area of the light transmitting portion DA100 of the cover window 100 may be increased. That is, the display area of the display device 10 may be enlarged.

The substrate 540 may be made of an insulating material, for example, plastic.

The first pad 550 and the second pad 560 may be connected to the sound circuit board 600. The first pad 550 and the second pad 560 may be formed of a conductive material.

The first sound generator 500 may be connected to the sound circuit board 600. Specifically, the sound circuit board 600 may be attached onto the first and second pads 550 and 560 of the first sound generator 500 using an anisotropic conductive film. Further, the sound circuit board 600 may be provided with the sound connection portion 620 as shown in FIG. 2, and the sound connection portion 620 may be connected to the second connector 340 of the display circuit board 310. The sound circuit board 600 may be a flexible printed circuit board or a chip on film (COF).

The sound driving unit 610 may be formed of an integrated circuit, and may be mounted on the sound circuit board 600. The sound driving unit 610 may generate a first sound signal in response to first sound data provided from the main processor 920 of the main circuit board 910. In this case, the first sound data of the main processor 920 may be provided to the sound driving unit 610 via the main circuit board 910, the display circuit board 310, and the sound circuit board 600, and the first sound signal of the sound driving unit 610 may be transmitted to the first sound generator 500 through the first sound signal.

The sound driving unit 610 may include a digital signal processor (DSP) processing a first sound data as a digital signal, a digital analog converter (DAC) converting the first sound data processed in the digital signal processor into a first sound signal as an analog signal, and an amplifier (AMP) amplifying and outputting the first sound signal converted in the digital analog converter.

In the display device according to an exemplary embodiment, the first sound generator 500 is attached to the panel lower support 400 disposed under the display panel 300 and is connected to the sound circuit board 600 mounted with the sound driving unit 610, and the sound driving unit 610 is connected to the display circuit board 310, thereby making the first sound generator 500 and the sound circuit board 600 into one module together with the display panel 300.

The pressure sensing device 250 may be attached to the lower portion of the panel lower support 400. The pressure sensing device 250 may include a pressure sensor capable of sensing the pressure pressed by the user. The pressure sensing device may be implemented as a capacitive or resistive type pressure sensing device.

The pressure sensing device 250 may be formed in the form of a panel or a film. Or, the pressure sensing device 250 may be formed to be integrated with the touch sensing device 200. The pressure sensing device 250 may be removed in the region where the first sound generator 500 is disposed as shown in FIGS. 4 and 6, so as to prevent or reduce interference with the first sound generator 500.

A pressure sensing circuit board 260 may be attached to one side of the pressure sensing device 250. The pressure sensing circuit board 260 may be attached to pads provided on one side of the pressure sensing device 250 using an anisotropic conductive film. The pressure sensing circuit board 260 may be provided with a pressure sensing connection portion 280 as shown in FIG. 2, and the pressure sensing connection portion 280 may be connected to a connector 240 of the touch circuit board 210. The pressure sensing connection portion 280 may be attached onto the pads of the touch circuit board 210 using an anisotropic conductive film instead of the connector 240. The pressure sensing connection portion 280 may be connected to the display circuit board 310, not to the touch circuit board 210. The pressure sensing circuit board 260 may be a flexible printed circuit board or a chip on film (COF).

The pressure sensing unit 270 applies pressure driving signals PS to the pressure sensing device 250 and receives pressure sensing signals PDS from the pressure sensing device 250. The pressure sensing device 250 may analyze the pressure sensing signals PDS to calculate degree of pressure that the user presses the front surface of the display device 10, that is, pressure information. The pressure sensing unit 270 may be formed as an integrated circuit and mounted on the pressure sensing circuit board 260. The pressure sensing device 250 may be formed to be integrated with the touch driving unit 220, and in this case, the pressure sensing unit 270 mounted on the pressure sensing circuit board 260 may be omitted.

The lower bracket 800 may be disposed under the panel lower support 400 and the sound circuit board 600. The lower bracket 800 may be disposed to surround the cover window 100, the touch sensing device 200, the display panel 300, the panel lower support 400, the first sound generator 500, the touch circuit board 210, the display circuit board 310, and the sound circuit board 600. The lower bracket 800 may include a synthetic resin, a metal, or both a synthetic resin and a metal.

In the display device 10 according to an exemplary embodiment, the side surface of the lower bracket 800 may be exposed to the side surface of the display device 10, or the lower bracket 800 may be omitted and only the lower cover 900 may be provided.

The main circuit board 910 may be disposed under the lower bracket 800. The main circuit board 910 may be connected to the third connector 350 of the display circuit board 310 through a cable connected to the main connector 990. Thus, the main circuit board 910 may be connected to the display circuit board 310, the touch circuit board 210, and the sound circuit board 600. The main circuit board 910 may be a printed circuit board or a flexible printed circuit board.

As shown in FIG. 2, the main circuit board 910 may include a main processor 920, a second sound generator 930, a charging terminal 950, and a camera 960. Although it is illustrated in FIG. 2 that the main processor 920, the second sound generator 930, the charging terminal 950, and the camera 960 are disposed one surface of the main circuit board 910, the one surface facing the lower bracket 800, but the exemplary embodiments are not limited thereto. That is, the main processor 920, the second sound generator 930, the charging terminal 950, and the camera 960 may be disposed the other surface of the main circuit board 910, the other surface facing the lower cover 900.

The main processor 920 may control all the functions of the display device 10. For example, the main processor 920 may output image data to the display driving unit 320 of the display circuit board 310 such that the display panel 300 displays an image. Further, the main processor 920 may output the first sound data to the sound driving unit 610 of the sound circuit board 600 via the display circuit board 310 such that the first sound generator 500 outputs a sound. Further, the main processor 920 may output the second sound signal to the second sound generator 930 such that the second sound generator 930 outputs sound. The first sound data may be digital data, and the second sound signal may be an analog signal. Moreover, the main processor 920 may control the driving of the camera 960. The main processor 920 may be an application processor, a central processing unit, or a system chip, each including an integrated circuit.

The second sound generator 930 may be a speaker. Specifically, the second sound generator 930 may receive the second sound signal directly from the main processor 920 or may receive the second sound signal amplified from an amplifier for the second sound generator 930. The second sound generator 930 may output a second sound in accordance with the second sound signal.

The second sound generator 930 may be disposed on one side of the main circuit board 910. For example, as shown in FIG. 2, the second sound generator 930 is disposed on one side of the main circuit board 910 to provide the second sound to the lower side of the display device 10 through speaker holes SH1 and SH2 disposed one side of the lower cover 900. Although it is illustrated in FIGS. 1 and 2 that the second sound generator 930 includes a first sub-sound generator 931 disposed at one side of the charging terminal 950 and a second sub-sound generator 932 disposed at the other side of the charging terminal 950, the charging terminal being disposed between the first sub-sound generator 931 and the second sub-sound generator 932 of the second sound generator 930, but the exemplary embodiments are not limited thereto. For example, the second sound generator 930 may be disposed on only one of both sides of the charging terminal 950. Further, the charging terminal 950 may be disposed at any one of the position where the first sub-sound generator 931 is disposed and the position where the second sub-sound generator 932 is disposed, and the second sound generator 930 may be disposed at other positions where the charging terminal 950 is not disposed.

The charging terminal 950 is a terminal receiving a power from the outside, and may be connected to a power supply unit of the main circuit board 910.

The camera 960 processes an image frame such as a still image or a moving image obtained by an image sensor in a camera mode, and outputs the processed image frame to the main processor 920.

In addition, the main circuit board 910 may be further provided with a mobile communication module capable of transmitting and receiving a radio signal to/from at least one of a base station, an external terminal, and a server. The radio signal may include various types of data depending on a voice signal, a video call signal, or a text/multimedia message transmission/reception.

The lower cover 900 may be disposed under the lower bracket 800 and the main circuit board 910. The lower cover 900 may form a lower surface appearance of the display device 10. The lower cover 900 may be provided on one side surface thereof with a charging terminal hole CT and speaker holes for outputting the sound of the second sound generator 930. The lower cover 900 may include plastic and/or metal.

Figure 10:
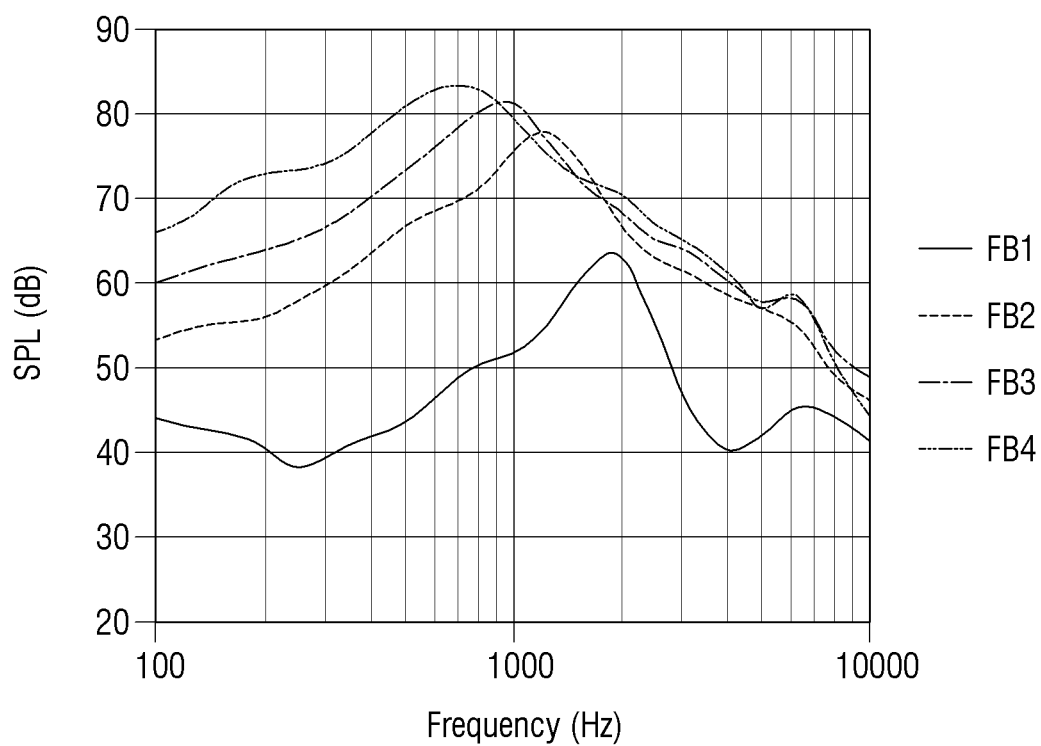
FIG. 10 is a graph showing the sound pressure level of a sound provided to a user's ear in different situations.
Figure 11A:
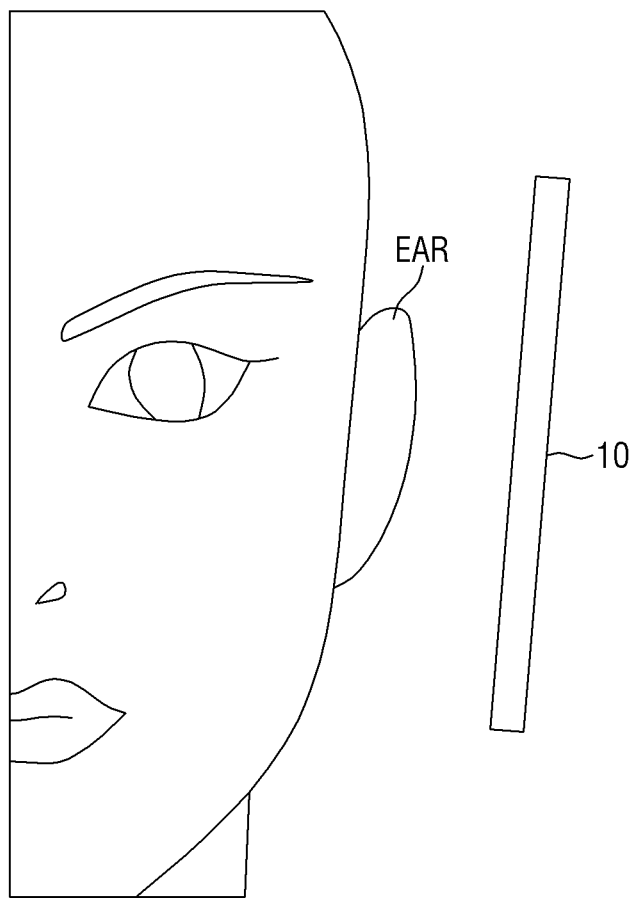
FIGS. 11A and 11B are schematic view illustrating a case where the display device contacts the user's ear and a case where the display device does not contact the user's ear.
Figure 11B:
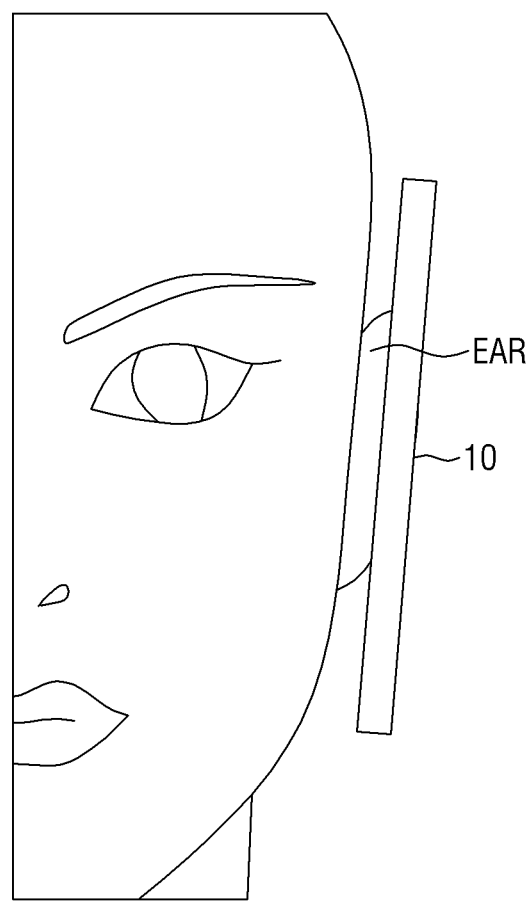

FIG. 10 is a graph showing the sound pressure level of a sound provided to a user's ear in different situations. FIGS. 11A and 11B are schematic view illustrating a case where the display device contacts the user's ear and a case where the display device does not contact the user's ear.

Particularly, FIG. 10 illustrates a graph showing the sound pressure level of a sound provided to a user's ear with respect to a wavelength when the user's ear does not contact the display device, when the user's ear contacts the display device without pressure, when the user's ear contacts the display device by first pressure, and when the user's ear contacts the display device by second pressure.

When a user makes a call using the display device 10, FIG. 10 shows a sound pressure level (SPL) FB1 when the user's ear does not contact the front surface of the display device 10, a sound pressure level FB2 when the user's ear contacts the front surface of the display device 10 without pressure, a sound pressure level FB3 when the user's ear contacts the front surface of the display device 10 by first pressure, and a sound pressure level FB4 when the user's ear contacts the front surface of the display device 10 by second pressure. As shown in FIG. 10, there is a difference in sound level pressure of sounds generated by the first sound generator 500 of the display device 10 in the aforementioned four cases.

Each of the sound pressure levels FB2, FB3, and FB4 when the user's ear EAR contacts the front surface of the display device 10 as shown in FIG. 11A is increased by about 20 dB or more in a frequency range of 1.5 kHz or less as compared with the sound pressure level FB1 when the user's ear EAR does not contact the front surface of the display device 10 as shown in FIG. 11B. Further, as the pressure of the user's ear EAR contacting the front surface of the display device 10, the sound pressure level in the frequency range of 1.5 kHz or less is increased by 7 dB to 14 dB, and is similar to a sound pressure level in a frequency range of 1.5 kHz or more.

Accordingly, when the user makes a call using the display device 10, the pressure sound level is adjusted for each frequency range according to whether the user's ear EAR contacts the front surface of the display device 10 and whether the user's ear EAR contacts the front surface of the display device 10 to such a degree of pressure, and thus it is required to provide optimal call quality to the user. Hereinafter, details thereof will be described with reference to the drawings.

Figure 12:
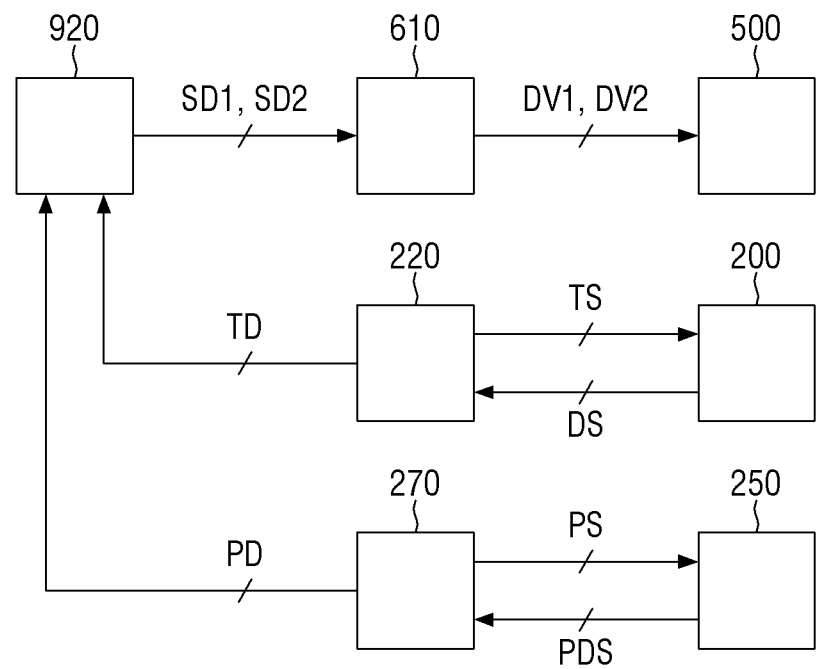
FIG. 12 is a block diagram showing a main processor, a sound driving unit, a first sound generator, a touch driving unit, a touch sensing device, a pressure sensing unit, and a pressure sensing device in the display device constructed according to an exemplary embodiment.
Figure 13:
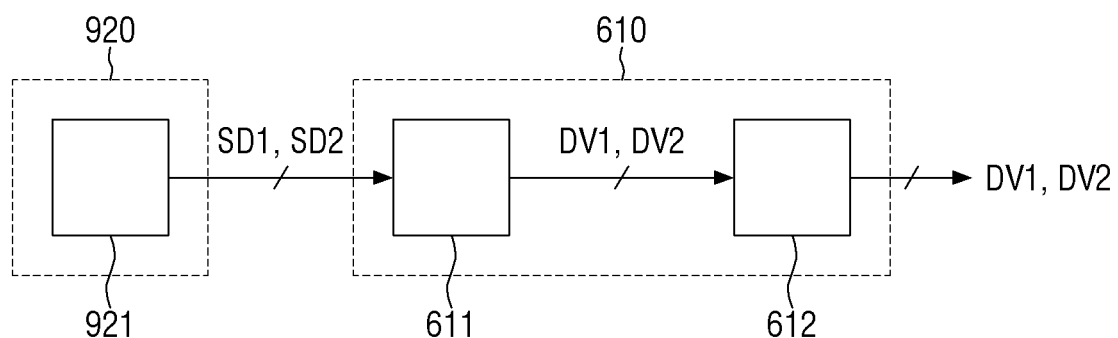
FIG. 13 is a block diagram showing an example of the main processor and sound driving unit of FIG. 12.

FIG. 12 is a block diagram showing a main processor 920, a sound driving unit 610, a first sound generator 500, a touch driving unit 220, a touch sensing device 200, a pressure sensing unit 270, and a pressure sensing device 250 in the display device according to an exemplary embodiment. FIG. 13 is a block diagram showing an example of the main processor 920 and sound driving unit 610 of FIG. 12.

Referring to FIGS. 12 and 13, the touch driving unit 220 applies touch driving signals TS to the touch sensing device 200 and receives sensing signals DS from the touch sensing device 200. The touch driving unit 220 may calculate the touch position of the user by analyzing the sensing signals DS.

The pressure sensing unit 270 applies pressure driving signals PS to the pressure sensing device 250 and receives pressure sensing signals PDS from the pressure sensing device 250. The pressure sensing unit 270 may analyze the pressure sensing signals PDS to calculate the degree to which the user presses the front surface of the display device 10. The pressure sensing unit 270 outputs pressure data PD including information about the pressure the user presses the display device 10 to the main processor 920.

As shown in FIG. 13, the main processor 920 may include a digital signal processor 921. The digital signal processor 921 modulates first sound data SD1 and second sound data SD2 to be output to the sound driving unit 610 for each frequency range on the basis of touch data TD and pressure data PD. The digital signal processor 921 outputs the modulated first sound data SD1 and second sound data SD2 to the sound driving unit 610. A method of modulating the first sound data SD1 and second sound data SD2 of the digital signal processor 921 will be described in detail with reference to FIG. 14.

As shown in FIG. 13, the sound driving unit 610 includes a digital-analog converter 611 and an amplifier 612. The digital-analog converter 611 converts first modulated sound data SD1 and second modulated sound data SD2 into a first driving voltage DV1 and a second driving voltage DV2. The amplifier 612 amplifies the first driving voltage DV1 and the second driving voltage DV2 and outputs the amplified first driving voltage DV1 and the amplified second driving voltage DV2 to the first sound generator 500.

Figure 14:
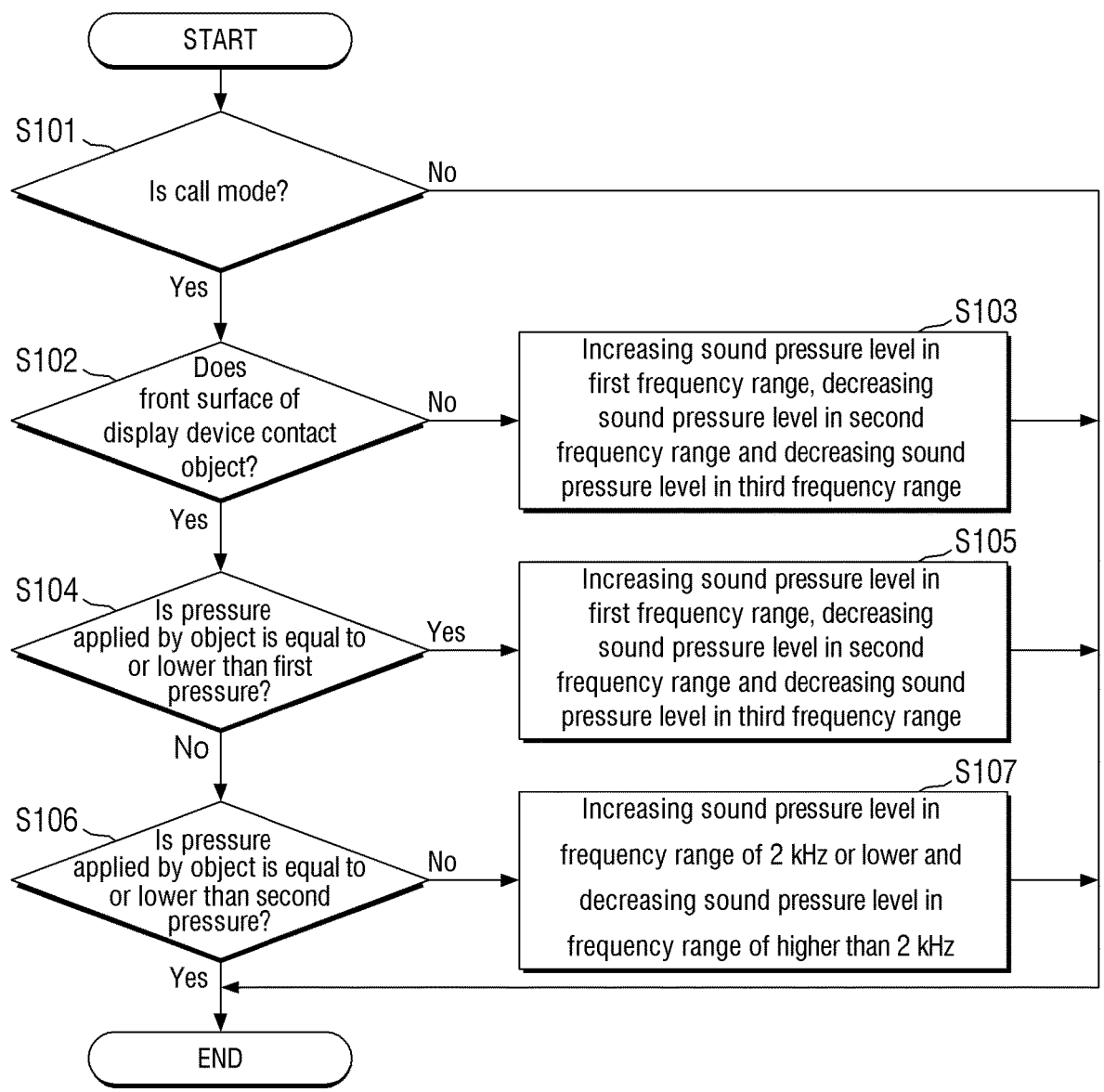
FIG. 14 is a flowchart showing a method of driving a display device constructed according to an exemplary embodiment.
Figure 15A:
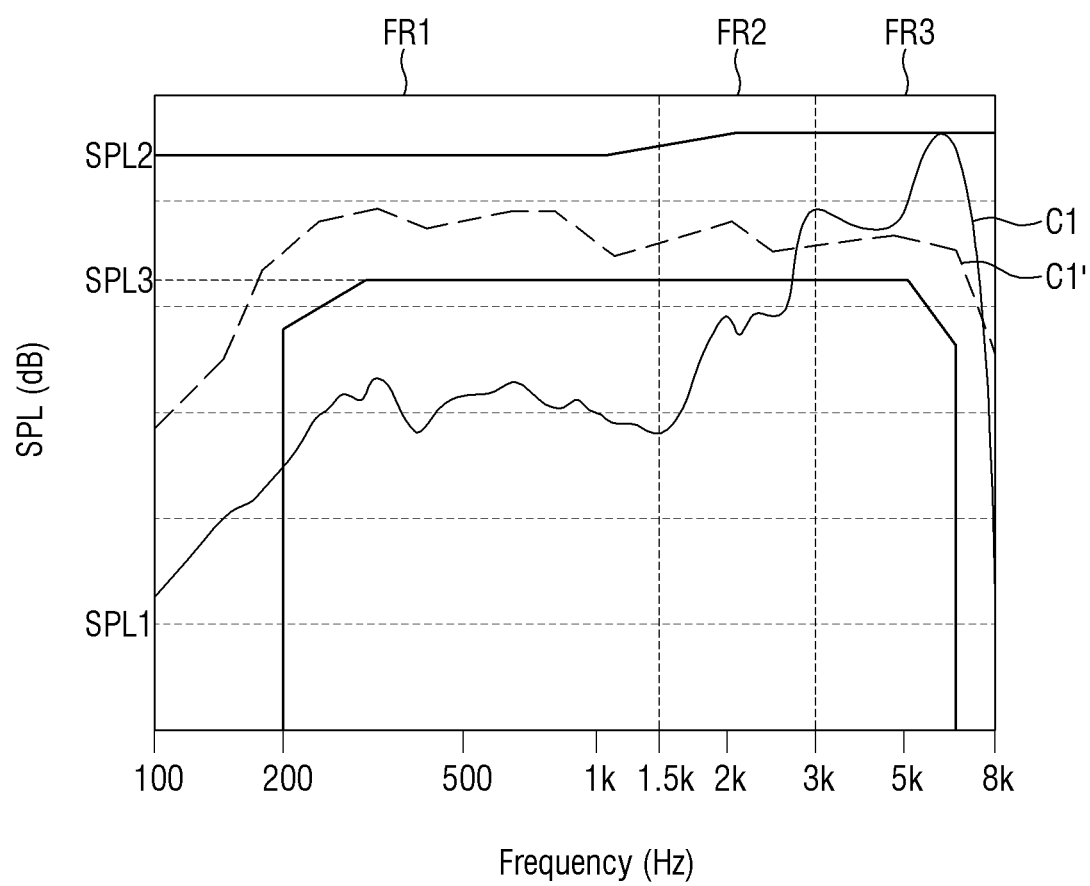
FIG. 15A is a graph the sound pressure levels of sounds output from a first sound generator with respect to a wavelength in a first mode.
Figure 16A:
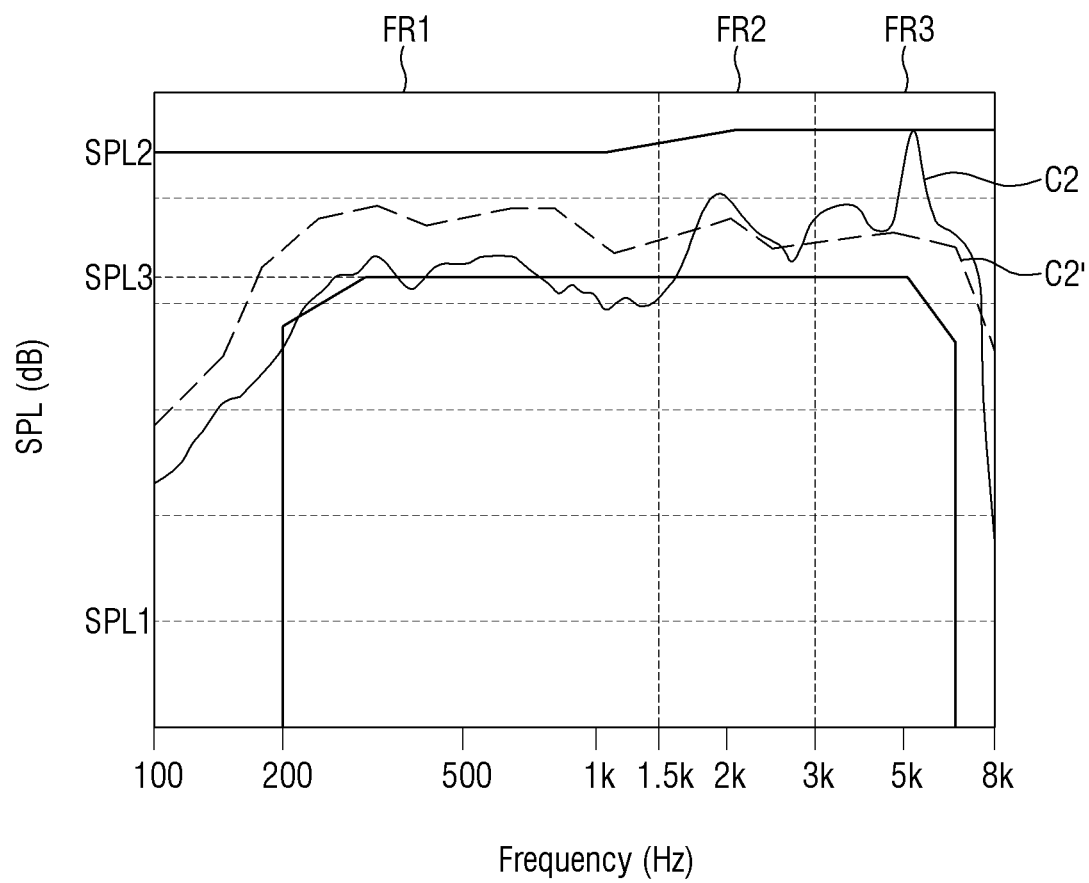
FIG. 16A is a graph the sound pressure levels of sounds output from a first sound generator with respect to a wavelength in a second mode.
Figure 17A:
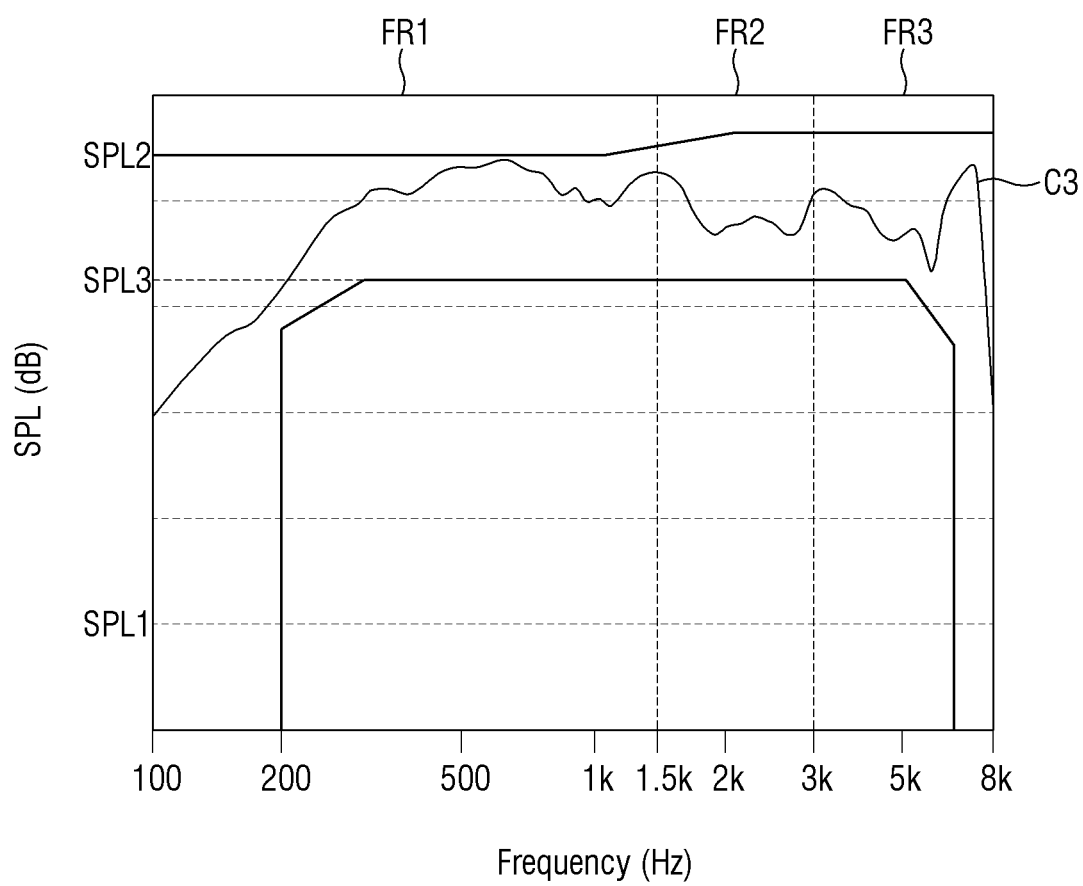
FIG. 17A is a graph the sound pressure levels of sounds output from a first sound generator with respect to a wavelength in a third mode.

FIG. 14 is a flowchart showing a method of driving a display device according to an exemplary embodiment. FIG. 15A is a graph the sound pressure levels of sounds output from a first sound generator with respect to a wavelength in a first mode, and FIG. 15B is a table showing the increase and decrease of driving voltages applied to the first sound generator. FIG. 16A is a graph the sound pressure levels of sounds output from a first sound generator with respect to a wavelength in a second mode, and FIG. 16B is a table showing the increase and decrease of driving voltages applied to the first sound generator. FIG. 17A is a graph the sound pressure levels of sounds output from a first sound generator with respect to a wavelength in a third mode, and FIG. 17B is a table showing the increase and decrease of driving voltages applied to the first sound generator.

Referring to FIG. 14, first, the main processor 920 determines whether the display device 10 is operating in a call mode. The call mode refers to a mode in which a user performs a voice call or a video call through a mobile communication module of the main circuit board 910 (S101 in FIG. 14).

Second, the main processor 920 determines whether the user's ear is in contact with the front surface of the display device 10 by the touch sensing device 200 when the display device 10 is operating in the call mode. The main processor 920 controls the sound output of the first sound generator 500 to the first mode when the user's ear is not in contact with the front surface of the display device 10 by the touch sensing device 200 (S102 in FIG. 14).

Third, the main processor 920 modulates the first sound data SD1 and the second sound data SD2 such that the sound pressure level of the sound generated by the first sound generator 500 in the first mode is between the first sound pressure level SPL1 and the second sound pressure level SPL2 in the first frequency range FR1, is between the third sound pressure level SPL3 and the second sound pressure level SPL2 in the second frequency range FR2, and is between the first sound pressure level SPL1 and the second sound pressure level SPL2 in the third frequency range FR3. The first frequency range FR1 refers to a range where a wavelength is greater than 0 Hz and 1.5 kHz or less, the second frequency range FR2 refers to a range where the wavelength is greater than 1.5 kHz and 3 kHz or less, and the third frequency range FR3 refers to a range where the wavelength is greater than 3 kHz and 8 kHz or less (S103 in FIG. 14).

Specifically, the first curve C1 of FIG. 15A indicates the sound pressure level of a sound generated by the first sound generator 500 in accordance with the first sound data SD1 and second sound data SD2, which are not modulated according to an exemplary embodiment, when the user's ear is not in contact with the first surface of the display device 10. The first curve C1' of FIG. 15A indicates the sound pressure level of a sound generated by the first sound generator 500 in accordance with the first sound data SD1 and second sound data SD2, which are not modulated according to an exemplary embodiment, when the user's ear is not in contact with the first surface of the display device 10.

When the sound pressure level is between the third sound pressure level SPL3 and the second sound pressure level SPL2 at a frequency of 200 Hz to 5 kHz as shown in FIG. 15A, the sound pressure level may be maintained uniformly regardless of frequency, thereby providing optimal sound quality to the user. However, when the user's ear is not in contact with the front surface of the display device 10 as in the first curve C1 of FIG. 15A, the sound pressure level of the sound generated by the first sound generator 500 is not uniform in the first, second, and third frequency ranges FR1, FR2, and FR3. That is, the sound pressure level is lower than the third sound pressure level SPL3 in the range where the frequency is lower than 2 kHz in the first frequency range FR1 and the second frequency range FR2 as in the first curve C1 of FIG. 15A. Further, the sound pressure level is lower than the third sound pressure level SPL3 in the third frequency range FR3 and the range where the frequency is 2 kHz or more in the second frequency range FR2 and the second frequency range FR2 as in the first curve C1 of FIG. 15A.

Therefore, in order to provide optimal sound quality to the user by maintaining the sound pressure level regardless of frequency, the sound pressure level in the first frequency range FR1 should be increased than the third sound pressure level SPL3, and the sound pressure level should be lowered in the second frequency range FR2 and the third frequency range FR3, as in the first curve C1' of FIG. 15A. Whether to increase or decrease the sound pressure level in each frequency range is determined based on the maximum value of the sound pressure level in each frequency range. Therefore, it is necessary to further lower the sound pressure level in the third frequency range FR3 than the sound pressure level in the second frequency range FR2.

For this purpose, the digital signal processor 921 of the main processor 920 modulates the first sound data SD1 and the second sound data SD2 for each frequency range. Specifically, as the voltage difference between the first driving voltage DV1 applied to the first electrode 510 of the first sound generator 500 and the second driving voltage DV2 applied to the second electrode 520 thereof increases, the vibration intensity of the vibration layer 530 of the first sound generator 500 increases. Accordingly, in order to allow the sound pressure level to be higher than the third sound pressure level SPL3 in the first frequency range FR1, the digital signal processor 921 modulates the first sound data SD1 and the second sound data SD2 so as to increase the voltage difference between the first driving voltage DV1 and second driving voltage DV2 applied to the first sound generator 500 as shown in FIG. 15B. Further, in order to lower the sound pressure level in the second frequency range FR2, the digital signal processor 921 modulates the first sound data SD1 and the second sound data SD2 so as to decrease the voltage difference between the first driving voltage DV1 and second driving voltage DV2 applied to the first sound generator 500 as shown in FIG. 15B. In this case, as shown in FIG. 15B, the reduced value of the voltage difference between the first driving voltage DV1 and the second driving voltage DV2 in the third frequency range FR3 may be greater than the reduced value of the voltage difference between the first driving voltage DV1 and the second driving voltage DV2 in the second frequency range FR2. Consequently, the digital signal processor 921 modulates the first sound data SD1 and the second sound data SD2 in consideration of whether to increase and decrease the voltage difference between the first drive voltage DV1 and second drive voltage DV2 applied to the first sound generator 500 in the first, second, and third frequency ranges FR1, FR2, and FR3.

Fourth, the main processor 920 determines whether the pressure sensed by the pressure sensing device 250 is equal to or less than the first pressure when the user's ear is in contact with the front surface of the display device 10 by the touch sensing device 200. The main processor 920 controls the sound output of the first sound generator 500 to the second mode when the pressure sensed by the pressure sensing device 250 is equal to or less than the first pressure (S104 in FIG. 14).

Fifth, the main processor 920 modulates the first sound data SD1 and the second sound data SD2 such that the sound pressure level of the sound generated by the first sound generator 500 in the second mode is between the first sound pressure level SPL1 and the second sound pressure level SPL2 in the first frequency range FR1, is between the third sound pressure level SPL3 and the second sound pressure level SPL2 in the second frequency range FR2, and is between the first sound pressure level SPL1 and the second sound pressure level SPL2 in the third frequency range FR3 (S105 in FIG. 14).

Specifically, the second curve C2 of FIG. 16A indicates the sound pressure level of a sound generated by the first sound generator 500 in accordance with the first sound data SD1 and second sound data SD2, which are not modulated according to an exemplary embodiment, when the pressure of the user's ear pressing the front surface of the display device 10 is equal to or lower than the first pressure. The second curve C2' of FIG. 16A indicates the sound pressure level of a sound generated by the first sound generator 500 in accordance with the first sound data SD1 and second sound data SD2, which are not modulated according to an exemplary embodiment, when the pressure of the user's ear pressing the front surface of the display device 10 is equal to or lower than the first pressure.

When the sound pressure level is between the third sound pressure level SPL3 and the second sound pressure level SPL2 at a frequency of 200 Hz to 5 kHz as shown in FIG. 16A, the sound pressure level may be maintained uniformly regardless of frequency, thereby providing optimal sound quality to the user. However, when the pressure of the user's ear pressing the front surface of the display device 10 is equal to or lower than the first pressure as in the second curve C2 of FIG. 16A, the sound pressure level of the sound generated by the first sound generator 500 is not uniform in the first, second, and third frequency ranges FR1, FR2, and FR3. That is, the sound pressure level is increased and decreased in the vicinity of the third sound pressure level SPL3 in the first frequency range FR1 and is present between the third sound pressure level SPL3 and the second sound pressure level SPL2 in the second frequency range FR2 as in the second curve C2 of FIG. 16A. Further, as in the second curve C2 of FIG. 16A, the maximum value of the sound pressure level has the second sound pressure level SPL2 in a range where the frequency is 5 kHz to 8 kHz in the third frequency range FR3.

Therefore, in order to provide optimal sound quality to the user by maintaining the sound pressure level regardless of frequency, the sound pressure level in the first frequency range FR1 should be increased than the third sound pressure level SPL3, and the sound pressure level should be lowered in the second frequency range FR2 and the third frequency range FR3, as in the second' curve C2' of FIG. 16A. Whether to increase or decrease the sound pressure level in each frequency range is determined based on the maximum value of the sound pressure level in each frequency range. Therefore, it is necessary to further lower the sound pressure level in the third frequency range FR3 than the sound pressure level in the second frequency range FR2.

For this purpose, the digital signal processor 921 of the main processor 920 modulates the first sound data SD1 and the second sound data SD2 for each frequency range. Specifically, in order to allow the sound pressure level to be higher than the third sound pressure level SPL3 in the first frequency range FR1, the digital signal processor 921 modulates the first sound data SD1 and the second sound data SD2 so as to increase the voltage difference between the first driving voltage DV1 and second driving voltage DV2 applied to the first sound generator 500 as shown in FIG. 16B. Further, in order to lower the sound pressure level in the second frequency range FR2, the digital signal processor 921 modulates the first sound data SD1 and the second sound data SD2 so as to decrease the voltage difference between the first driving voltage DV1 and second driving voltage DV2 applied to the first sound generator 500 as shown in FIG. 16B. In this case, as shown in FIG. 16B, the reduced value of the voltage difference between the first driving voltage DV1 and the second driving voltage DV2 in the third frequency range FR3 may be greater than the reduced value of the voltage difference between the first driving voltage DV1 and the second driving voltage DV2 in the second frequency range FR2. Consequently, the digital signal processor 921 modulates the first sound data SD1 and the second sound data SD2 in consideration of whether to increase and decrease the voltage difference between the first drive voltage DV1 and second drive voltage DV2 applied to the first sound generator 500 in the first, second, and third frequency ranges FR1, FR2, and FR3.

Sixth, the main processor 920 determines whether the pressure sensed by the pressure sensing device 250 is greater than the first pressure and equal to or less than the second pressure when the user's ear is in contact with the front surface of the display device 10 by the touch sensing device 200. The main processor 920 controls the sound output of the first sound generator 500 to the third mode when the pressure sensed by the pressure sensing device 250 is greater than the first pressure and equal to or less than the second pressure. Further, the main processor 920 controls the sound output of the first sound generator 500 to the fourth mode when the pressure sensed by the pressure sensing device 250 is greater than the second pressure (S106 in FIG. 14).

Although the main processor 920 does not modulate the first sound data SD1 and the second sound data SD2 in the third mode as shown in FIG. 17A, the sound pressure level of the sound generated by the first sound generator 500 is between the third sound pressure level SPL3 and the second sound pressure level SPL2 at a frequency of 200 Hz to 5 kHz. Therefore, the main processor 920 does not modulate the first sound data SD1 and the second sound data SD2 in the third mode as shown in FIG. 17B.

Seventh, the main processor 920 increases the sound pressure level in the first frequency range FR1 in the fourth mode and decreases the sound pressure level in the second frequency range FR2 and the third frequency range FR3 (S107 of FIG. 14).

Figure 18:
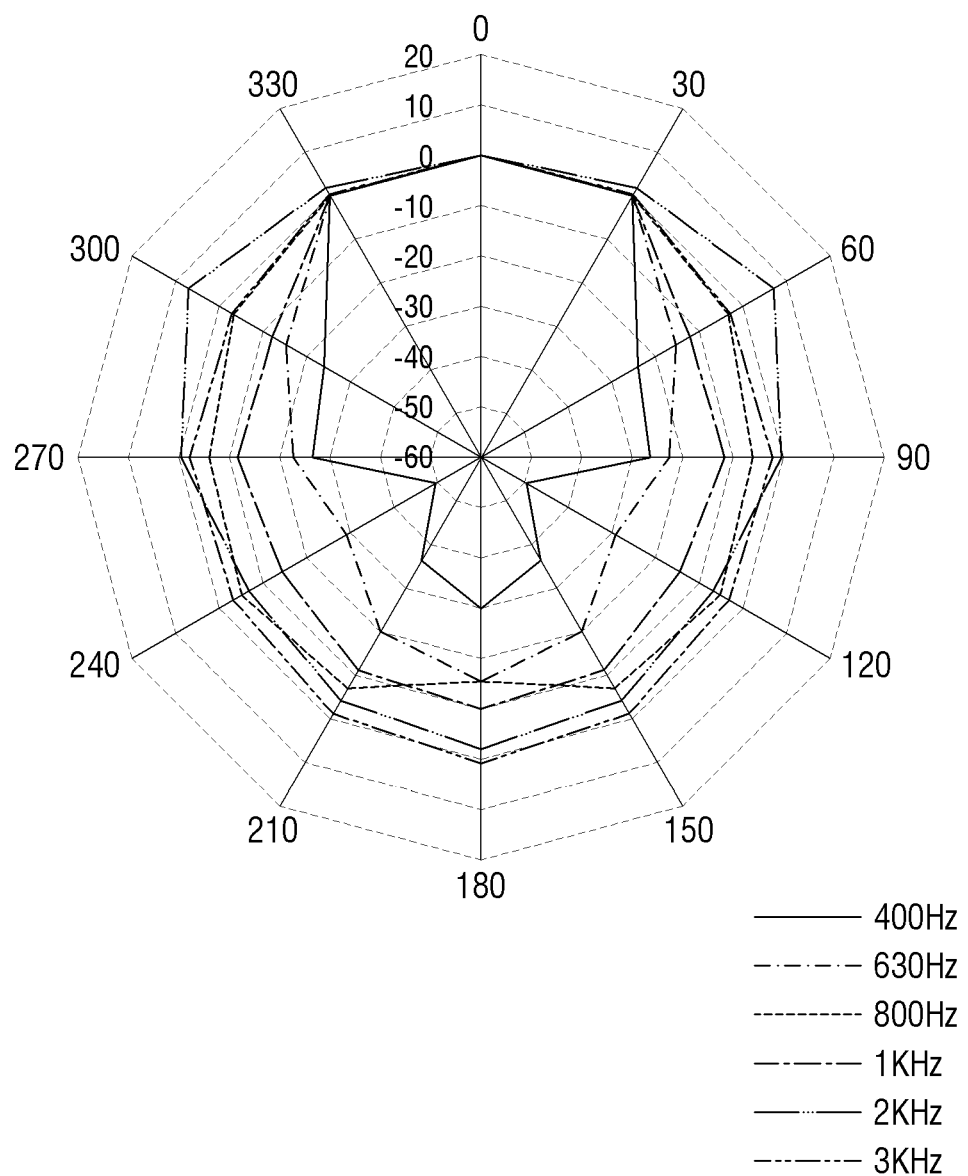
FIG. 18 is an exemplary view showing the directionality of a sound generated by the first sound generator when the front surface of the display device does not contact an object.
Figure 19:
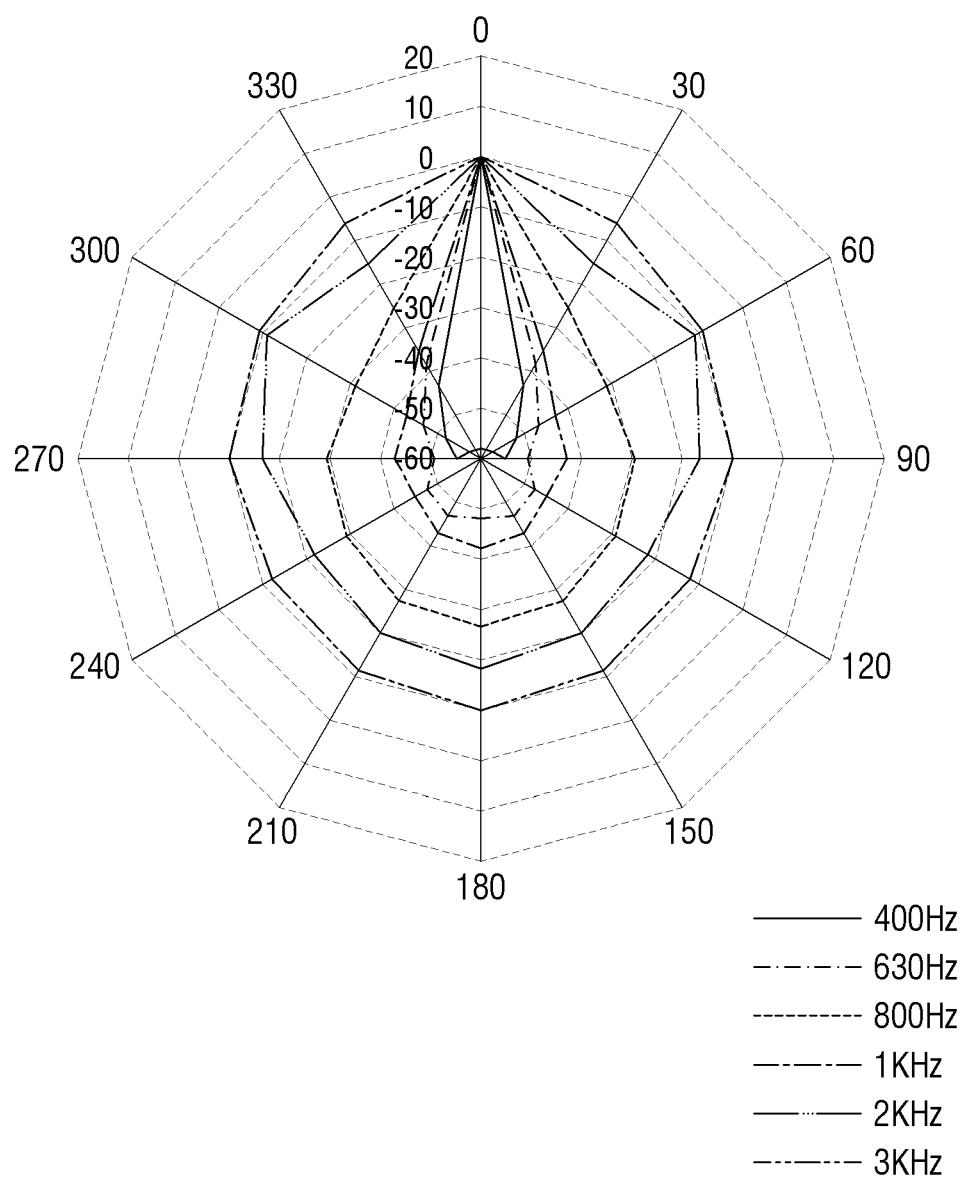
FIG. 19 is an exemplary view showing the directionality of a sound generated by the first sound generator when the front surface of the display device contacts an object.
Figure 20:
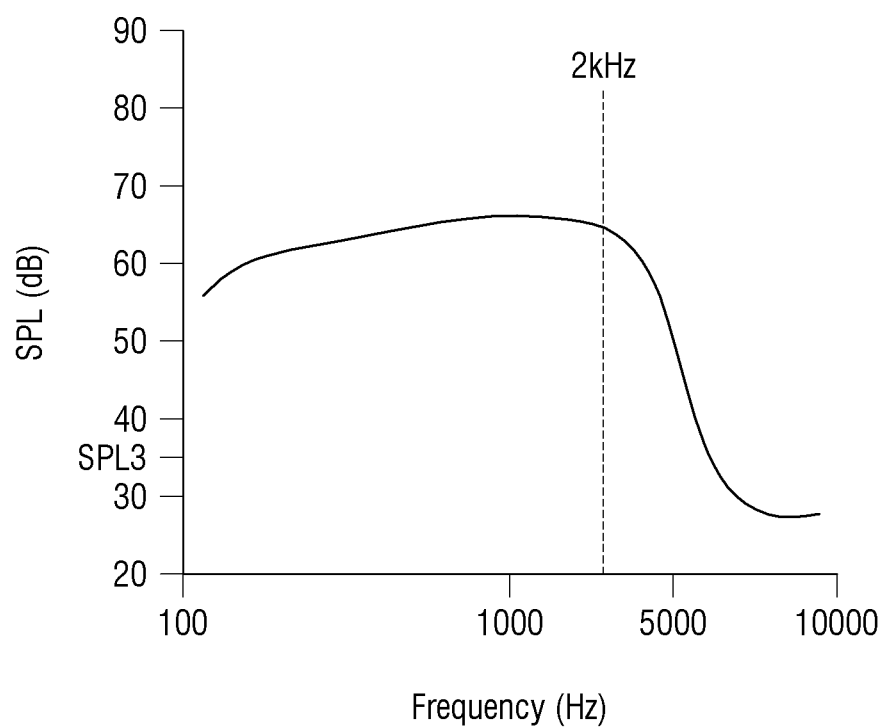
FIG. 20 is a graph the sound pressure level of a sound generated by a first sound generator with respect to a wavelength in a fourth mode.

FIG. 18 is an exemplary view showing the directionality of a sound generated by the first sound generator when the front surface of the display device does not contact an object. FIG. 19 is an exemplary view showing the directionality of a sound generated by the first sound generator when the front surface of the display device contacts an object. FIG. 20 is a graph the sound pressure level of a sound generated by a first sound generator with respect to a wavelength in a fourth mode.

Specifically, when the user is in a highly noisy environment in the call mode, the user generally presses the front surface of the display device 10 with his ear in order to easily listen to the voice of the counterpart. Further, as shown in FIG. 18, when the front surface of the display device 10 is not in contact with an object, the sound generated by the first sound generator 500 is diverted in all directions. However, as shown in FIG. 19, when the front surface of the display device 10 is in contact with the object, a sound having a sound pressure level of 2 kHz or less, of the sound generated by the first sound generator 500, is directed forward, and a sound having a sound pressure level of 2 kHz or more, of the sound generated by the first sound generator 500, is diverted in all directions.

Therefore, when the user is in a highly noisy environment in the call mode, if the sound pressure level of the sound of 2 kHz or less with high directivity forward is increased, the user can smoothly listen to the voice of the counterpart. Accordingly, the main processor 920 may increase the sound pressure level of the sound in the frequency range of 2 kHz or less and decrease the sound pressure level of the sound in the frequency range higher than 2 kHz as shown in FIG. 20. For example, the main processor 920 may include a low pass filter passing a frequency of 2 kHz or less and blocking a frequency of more than 2 kHz. In this case, the sound pressure level of a sound generated by the first sound generator 500 greatly decreases at a frequency of 2 kHz or more. Thus, the sound pressure level of the sound generated by the first sound generator 500 may be equal to or lower than the fourth sound pressure level SPL4 at a frequency of 5 kHz or more. The fourth sound pressure level SPL4 may be lower than the third sound pressure level SPL3, and may be, for example, 35 dB or less.

The main processor 920 may increase the sound pressure level in the first frequency range FR1 in the fourth mode, and may decrease the sound pressure level in the second frequency range FR2 and the third frequency range FR3. For this purpose, the digital signal processor 921 of the main processor 920 modulates the first sound data SD1 and the second sound data SD2 for each frequency range. Specifically, in order to increase the sound pressure level in the first frequency range FR1, the digital signal processor 921 modulates the first sound data SD1 and the second sound data SD2 so as to increase the voltage difference between the first driving voltage DV1 and second driving voltage DV2 applied to the first sound generator 500. Further, in order to decrease the sound pressure level in the second frequency range FR2 and the third frequency range R3, the digital signal processor 921 modulates the first sound data SD1 and the second sound data SD2 so as to decrease the voltage difference between the first driving voltage DV1 and second driving voltage DV2 applied to the first sound generator 500 as shown in FIG. 16B. Consequently, the digital signal processor 921 modulates the first sound data SD1 and the second sound data SD2 in consideration of whether to increase and decrease the voltage difference between the first drive voltage DV1 and second drive voltage DV2 applied to the first sound generator 500 in the first, second, and third frequency ranges FR1, FR2, and FR3.

As described above, in the display device 10 according to the driving method shown in FIG. 14, the digital signal processor 921 modulates the first sound data SD1 and the second sound data SD2 in consideration of whether the user's ear contacts the front surface of the display device 10 and the pressure of the user's ear pressing the front surface of the display device 10, thereby increasing and decreasing the sound pressure level for each frequency range. Therefore, since the sound pressure level can be uniformly maintained in a low-frequency range, a middle-frequency range, and a high-frequency range regardless of whether the user's ear contacts the front surface of the display device 10 and the pressure of the user's ear pressing the front surface of the display device 10, high-quality sound can be provided.

Figure 21:
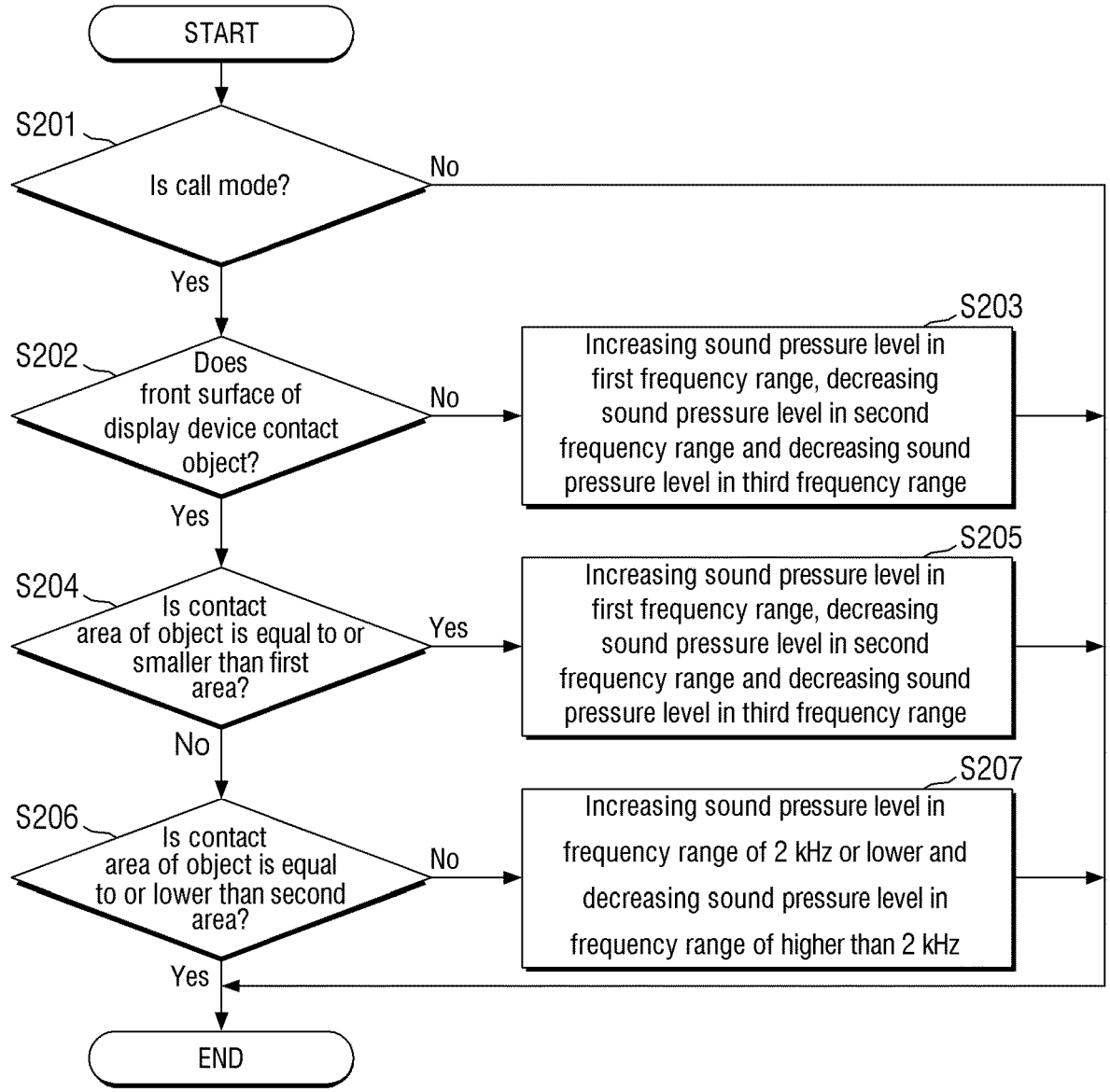
FIG. 21 is a flowchart showing a method of driving a display device constructed according to another exemplary embodiment.
Figure 22A:
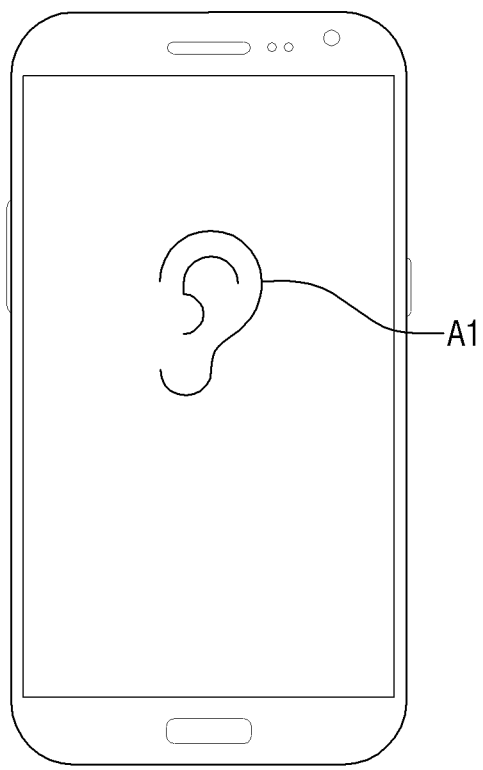
FIGS. 22A and 22B are exemplary views showing the contact areas of the user's ear contacting the display device.
Figure 22B:
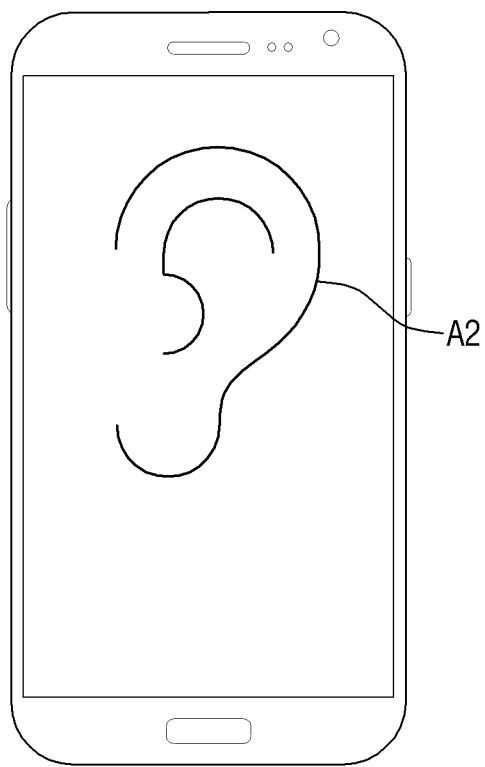

FIG. 21 is a flowchart showing a method of driving a display device according to another exemplary embodiment. FIGS. 22A and 22B are exemplary views showing the contact areas of the user's ear contacting the display device.

S201, S202, and S203 shown in FIG. 21 are substantially the same as S101, S102, and S103 described with reference to FIG. 14. Therefore, a detailed description of the S201, S202, and S203 shown in FIG. 21 will be omitted.

Fourth, when the user's ear contacts the front surface of the display device 10 by the touch sensing device 200, the main processor 920 determines whether the contact area of the user's ear is less than or equal to the first area A1 as shown in FIG. 22A. The main processor 920 may analyze touch data TD to determine the contact area of the user's ear. For example, the main processor 920 may calculate the touch area according to the number of touch cells sensed by the user.

Since the contact area of the user's ear increases as the pressure of the user pressing the front surface of the display device 10 increases, when the contact area of the user's ear is equal to or less than the first area A1, the main processor 920 may determine that the user's ear presses the front surface of the display device 10 at a pressure lower than the first pressure. Therefore, when the contact area of the user's ear is equal to or less than the first area A1, the main processor 920 controls the sound output of the first sound generator 500 to the second mode (S204 in FIG. 21).

A step S205 shown in FIG. 21 is substantially same as a step S105 shown in FIG. 14. Therefore, brief explanation regarding the step S205 is omitted.

Sixth, when the user's ear is in contact with the front surface of the display device 10 by the touch sensing device 200, the main processor 920 determines whether the contact area of the user's ear is larger than the first area A1 as shown in FIG. 22A, and is less than or equal to the second area A2 as shown in FIG. 22B.

Since the contact area of the user's ear increases as the pressure of the user pressing the front surface of the display device 10 increases, when the contact area of the user's ear is larger than the first area A1 and is less than or equal to the second area A2, the main processor 920 may determine that the user's ear presses the front surface of the display device 10 with a pressure higher than the first pressure and lower than the second pressure. Therefore, when the contact area of the user's ear is larger than the first area A1 and smaller than the second area A2, the main processor 920 controls the sound output of the first sound generator 500 to the third mode. Further, when the contact area of the user's ear is larger than the second area A2, the main processor 920 controls the sound output of the first sound generator 500 to the fourth mode (S206 in FIG. 14).

Although the main processor 920 does not modulate the first sound data SD1 and the second sound data SD2 in the third mode as shown in FIG. 17A, the sound pressure level of the sound generated by the first sound generator 500 is between the third sound pressure level SPL3 and the second sound pressure level SPL2 at a frequency of 200 Hz to 5 kHz. Therefore, the main processor 920 does not modulate the first sound data SD1 and the second sound data SD2 in the third mode as shown in FIG. 17B.

S207 shown in FIG. 21 are substantially the same as S107 described with reference to FIG. 14. Therefore, a detailed description of the S207 shown in FIG. 21 will be omitted.

As described above, in the display device 10 according to the driving method shown in FIG. 21, the first sound data SD1 and the second sound data SD2 are modulated in consideration of whether the user's ear contacts the front surface of the display device 10 and the pressure of the user's ear pressing the front surface of the display device 10, thereby increasing and decreasing the sound pressure level for each frequency range. Therefore, since the sound pressure level can be uniformly maintained in a low-frequency range, a middle-frequency range, and a high-frequency range regardless of whether the user's ear contacts the front surface of the display device 10 and the pressure of the user's ear pressing the front surface of the display device 10, high-quality sound can be provided.

Further, in the display device 10 according to the driving method shown in FIG. 21, the contact area of the user's ear sensed using the touch sensing device 200 instead of the pressure sensing device 250 may be determined, thereby determining the pressure of the user's ear pressing the front surface of the display device 10. Therefore, the pressure sensing device 250 for sensing the pressure to be pressed on the front surface of the display device 10 may be omitted.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
a display panel configured to display an image;
a touch sensing device disposed on a first surface of the display panel and configured to sense a touch of an object;
a pressure sensing device disposed on a second surface of the display panel, separate from the touch sensing device, and configured to sense pressure of the object;
a sound driver configured to generate and transmit a first sound driving signal and a second sound driving signal according to first sound data and second sound data;
a main processor configured to provide the first sound data and the second sound data to the sound driver; and
a sound generator configured to generate a sound according to the first sound driving signal and the second sound driving signal, such that a sound pressure level in a first frequency range is between a first sound pressure level and a second sound pressure level in a first operating mode and a second operating mode and such that a sound pressure level in a second frequency range and a third frequency range is between a third sound pressure level and the second sound pressure level in the first operating mode and the second operating mode,
wherein the third sound pressure level is higher than the first sound pressure level, and the second frequency range is higher than the first frequency range, and the third frequency range is higher than the second frequency range,
wherein the display device is in the first operating mode in response to the touch sensing device not sensing the touch of the object, and the display device is in the second operating mode in response to the touch sensing device sensing the touch of the object and the pressure sensing device sensing the pressure of the object, and
wherein the main processor is configured to modulate the first sound data and the second sound data such that the sound pressure level in the first frequency range is increased, the sound pressure level in the second frequency range is decreased, and the sound pressure level in the third frequency range is more decreased than the sound pressure level in the second frequency range, in the first operating mode and the second operating mode.

2. The display device of claim 1, wherein the sound generator is configured to generate the sound such that a sound pressure level within a frequency range of 200 Hz to 5 kHz is between the third sound pressure level and the second sound pressure level.

3. The display device of claim 1, wherein the second surface of the display panel is disposed opposite to the first surface.

4. The display device of claim 1, wherein the display device is in the second operating mode in response to the pressure sensing device sensing the pressure of the object being equal to or lower than a first pressure, and
wherein the display device is in a third operating mode in response to the pressure sensing device sensing the pressure of the object being higher than the first pressure and is equal to or lower than a second pressure.

5. The display device of claim 4, wherein the sound generator is disposed on a second surface of the display panel, opposite to the first surface, and
wherein the pressure sensing device is disposed on the second surface of the display panel except for a region where the sound generator is disposed.

6. The display device of claim 4, wherein the sound generator is configured to generate the sound such that the sound pressure level in the second frequency range in the second operating mode and the third operating mode.

7. The display device of claim 6, wherein the sound generator is configured to generate the sound such that a sound pressure level in the third frequency range in the second operating mode and the third operating mode.

8. The display device of claim 4, wherein the sound generator is configured to generate the sound such that a sound pressure level within a frequency range of 200 Hz to 5 kHz.

9. The display device of claim 6, wherein the display device is in a fourth operating mode in response to the pressure sensing device sensing the pressure of the object being higher than the second pressure, and wherein the sound generator is configured to generate the sound such that a sound pressure level in a frequency range of 2 kHz or more is decreased in the fourth operating mode.

10. The display device of claim 9, wherein the sound generator is configured to generate the sound such that, a sound pressure level in a frequency range of 5 kHz or more is equal to or lower than a fourth sound pressure level in the fourth operating mode, the fourth sound pressure level being lower than the third sound pressure level.

11. The display device of claim 1, wherein the main processor comprises,
a digital signal processor configured to modulate the first sound data and the second sound data for each of the first frequency range, the second frequency range higher than the first frequency range, and the third frequency range higher than the second frequency range.

12. The display device of claim 11, wherein the sound driver comprises:
a digital-analog converter configured to convert the first sound data and the second sound data modulated by the digital signal processor into a first driving voltage and a second driving voltage, which are analog signals; and
an amplifier configured to amplify and transmit the first driving voltage and the second driving voltage.

13. A display device, comprising:
a display panel configured to display an image;
a touch sensing device configured to sense a touch of an object;
a sound driver configured to generate and transmit a first sound driving signal and a second sound driving signal according to first sound data and second sound data;
a main processor configured to provide the first sound data and the second sound data to the sound driver; and
a sound generator configured to generate a sound according to the first sound driving signal and the second sound driving signal, such that a sound pressure level in a first frequency range is between a first sound pressure level and a second sound pressure level in a first operating mode and a second operating mode and such that a sound pressure level in a second frequency range and a third frequency range is between a third sound pressure level and the second sound pressure level in the first operating mode and the second operating mode, wherein:
the third sound pressure level is higher than the first sound pressure level, and the second frequency range is higher than the first frequency range, and the third frequency range is higher than the second frequency range,
the display device is in the first operating mode in response to the touch sensing device not sensing the touch of the object, and the display device is in the second operating mode in response to the touch sensing device sensing the touch of the object,
the display device is in the first operating mode in response to the touch sensing device not sensing the touch of the object,
the display device is in the second operating mode in response to a contact area of the object being less than a first area,
the display device is in a third operating mode in response to the contact area of the object being larger than a first area and is equal to or smaller than a second area, and
wherein the main processor is configured to modulate the first sound data and the second sound data such that the sound pressure level in the first frequency range is increased, the sound pressure level in the second frequency range is decreased, and the sound pressure level in the third frequency range is more decreased than the sound pressure level in the second frequency range, in the first operating mode and the second operating mode.

14. The display device of claim 13, wherein the sound generator is configured to generate the sound such that the sound pressure level in the second frequency range of the sound is between the third sound pressure level and the second sound pressure level in the second operating mode and the third operating mode.

15. The display device of claim 14, wherein the sound generator is configured to generate the sound such that a sound pressure level in the third frequency range is between the first sound pressure level and the second sound pressure level in the second operating mode and the third operating mode.

16. The display device of claim 14, wherein the display device is in a fourth operating mode in response to the contact area of the object being larger than the second area, and
wherein the sound generator is configured to generate the sound such that a sound pressure level in a frequency range of 2 kHz or more is decreased in the fourth operating mode.

17. The display device of claim 16, wherein the sound generator is configured to generate the sound such that, a sound pressure level in a frequency range of 5 kHz or more is equal to or lower than a fourth sound pressure level in the fourth operating mode, the fourth sound pressure level being lower than the third sound pressure level.

18. The display device of claim 13, wherein the sound generator is configured to generate the sound such that a sound pressure level within a frequency range of 200 Hz to 5 kHz is between the third sound pressure level and the second sound pressure level.

19. A display device, comprising:
a display panel configured to display an image;
a lower support to support the display panel, the lower support comprising a heat dissipating member;
a touch sensing device disposed on a first surface of the display panel and configured to sense a touch of an object;
a pressure sensing device disposed on the heat dissipating member facing a second surface of the display panel, separate from the touch sensing device, and configured to sense pressure of the object;
a sound driver configured to generate and transmit a first sound driving signal and a second sound driving signal according to first sound data and second sound data; and
a sound generator configured to generate a sound according to the first sound driving signal and the second sound driving signal, such that a sound pressure level in a first frequency range is between a first sound pressure level and a second sound pressure level in a first operating mode and a second operating mode, the sound generator passing through the pressure sensing device,
wherein the display device is in the first operating mode in response to the touch sensing device not sensing the touch of the object, and the display device is in the second operating mode in response to the touch sensing device sensing the touch of the object and the pressure sensing device sensing the pressure of the object, and
wherein:

the pressure sensing device has a plate shape and through hole, the heat dissipating member is disposed between the display panel and the pressure sensing device, and has a plate shape and a through hole, and the sound generator is disposed in the through hole of the pressure sensing device and the through hole of the heat dissipating member.

* * * * *